United States Patent
Ferreira et al.

(10) Patent No.: US 10,535,081 B2
(45) Date of Patent: Jan. 14, 2020

(54) OPTIMIZING AUDIENCE ENGAGEMENT WITH DIGITAL CONTENT SHARED ON A SOCIAL NETWORKING SYSTEM

(71) Applicant: Facebook, Inc., Menlo Park, CA (US)

(72) Inventors: Rui Andre Augusto Ferreira, London (GB); Daniel Bernhardt, London (GB); Victor Lassance Oliveira E Silva, London (GB); Ian Douglas Hegerty, Andover (GB)

(73) Assignee: Facebook, Inc., Menlo Park, CA (US)

(*) Notice: Subject to any disclaimer, the term of this patent is extended or adjusted under 35 U.S.C. 154(b) by 493 days.

(21) Appl. No.: 15/385,464

(22) Filed: Dec. 20, 2016

(65) Prior Publication Data

US 2018/0174190 A1 Jun. 21, 2018

(51) Int. Cl.
*G06Q 30/02* (2012.01)
*G06Q 50/00* (2012.01)

(52) U.S. Cl.
CPC ..... *G06Q 30/0264* (2013.01); *G06Q 30/0246* (2013.01); *G06Q 50/01* (2013.01)

(58) Field of Classification Search
None
See application file for complete search history.

(56) References Cited

U.S. PATENT DOCUMENTS

| | | |
|---|---|---|
| 2012/0197995 A1 | 8/2012 | Caruso |
| 2014/0129324 A1 | 5/2014 | Spivack et al. |
| 2015/0170294 A1 | 6/2015 | Goyal et al. |

*Primary Examiner* — Alexandru Cirnu
(74) *Attorney, Agent, or Firm* — Keller Jolley Preece

(57) ABSTRACT

This disclosure generally covers systems and methods that schedule posts of one or more images, videos, or other digital content items through an account of a social networking system in a way that optimizes user engagement. In particular, certain embodiments of the disclosed systems and methods determine when to post digital content items by calculating data-driven user engagement scores and updating those scores with data tracked by the social networking system.

20 Claims, 12 Drawing Sheets

| Timeframe | Predicted User Engagement Score | Actual User Engagement Score | Scheduled Post | Digital Content Item Scheduled | Digital Content Item Rank |
|---|---|---|---|---|---|
| Timeframe 1 | 75 | | | | |
| Timeframe 2 | 63 | | | | |
| Timeframe 3 | 90 | | S | Image 001 | 3 |
| Timeframe 4 | 79 | | | | |
| Timeframe 5 | 100 | | S | Image 002 | 2 |
| Timeframe 6 | 90 | | | | |
| Timeframe 7 | 115 | | S | Image 003 | 1 |
| Timeframe 8 | 82 | | | | |
| Timeframe 9 | 73 | | | | |
| Timeframe 10 | 62 | | | | |

*Fig. 2A*

| Timeframe | Predicted User Engagement Score | Actual User Engagement Score | Scheduled Post | Content Scheduled | Content Rank |
|---|---|---|---|---|---|
| Timeframe 1 | 75 | 78 | | | |
| Timeframe 2 | 63 | 80 | | | |
| Timeframe 3 | 90 | 85 | | | |
| Timeframe 4 | 92 | | S | Image 001 | 3 |
| Timeframe 5 | 99 | | S | Image 002 | 2 |
| Timeframe 6 | 92 | | | | |
| Timeframe 7 | 117 | | S | Image 003 | 1 |
| Timeframe 8 | 83 | | | | |
| Timeframe 9 | 78 | | | | |
| Timeframe 10 | 65 | | | | |

*Fig. 2B*

| Timeframe | Predicted User Engagement Score | Actual User Engagement Score | Scheduled Post | Content Scheduled | Content Rank |
|---|---|---|---|---|---|
| Timeframe 1 | 75 | 78 | | | |
| Timeframe 2 | 63 | 80 | | | |
| Timeframe 3 | 90 | 85 | | | |
| Timeframe 4 | 92 | 91 | C | | |
| Timeframe 5 | 99 | | S | Image 001 | 3 |
| Timeframe 6 | 92 | | S | Image 002 | 2 |
| Timeframe 7 | 117 | | S | Image 003 | 1 |
| Timeframe 8 | 83 | | | | |
| Timeframe 9 | 78 | | | | |
| Timeframe 10 | 65 | | | | |

*Fig. 2C*

| Timeframe | Predicted User Engagement Score | Actual User Engagement Score | Scheduled Post | Content Scheduled | Content Rank |
|---|---|---|---|---|---|
| Timeframe 1 | 75 | 78 | | | |
| Timeframe 2 | 63 | 80 | | | |
| Timeframe 3 | 90 | 85 | | | |
| Timeframe 4 | 92 | 91 | C | Image 001 | 3 |
| Timeframe 5 | 99 | 150 | S | Image 003 | 1 |
| Timeframe 6 | 92 | | | | |
| Timeframe 7 | 117 | | S | Image 002 | 2 |
| Timeframe 8 | 83 | | | | |
| Timeframe 9 | 78 | | | | |
| Timeframe 10 | 65 | | | | |

*Fig. 2D*

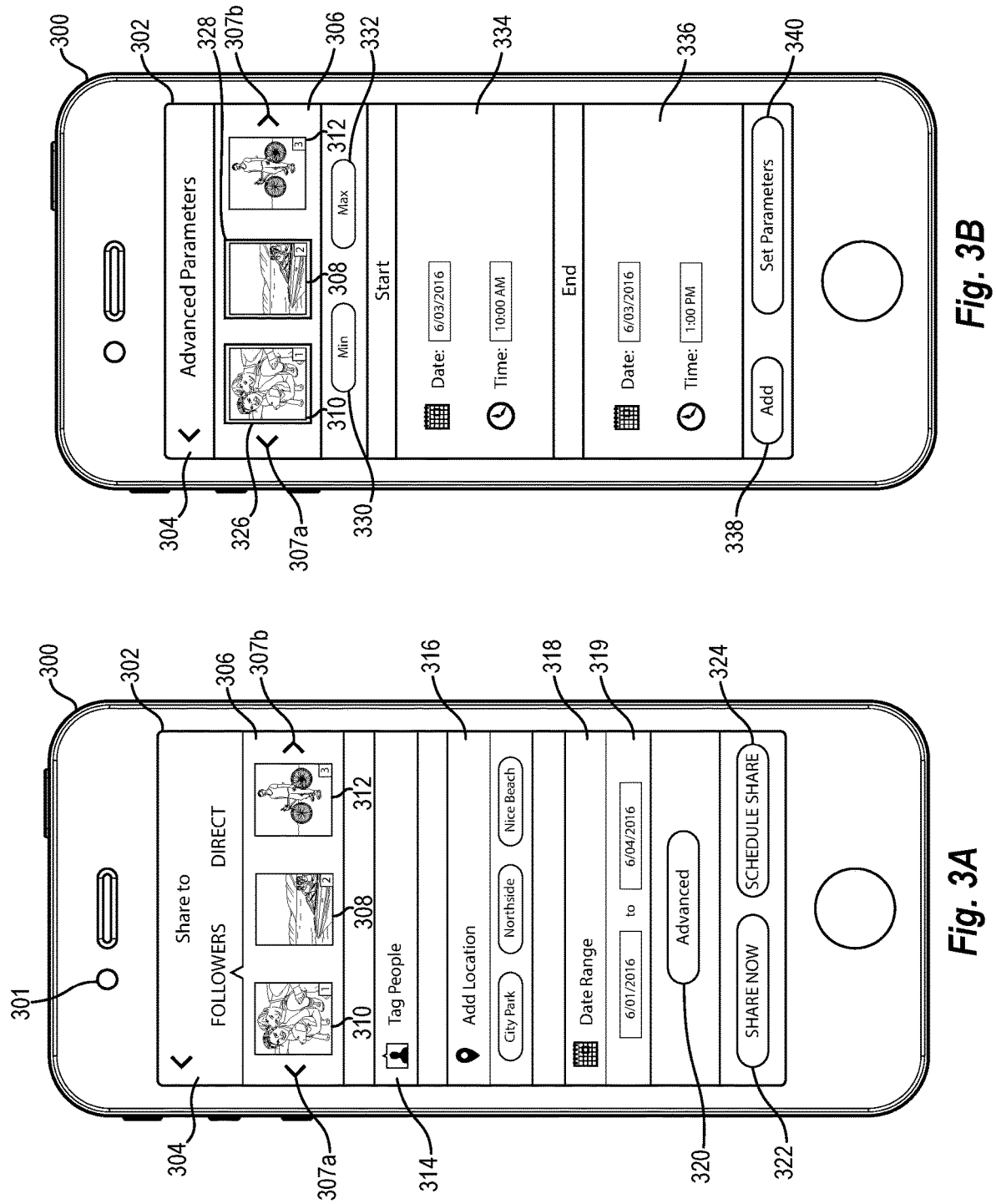

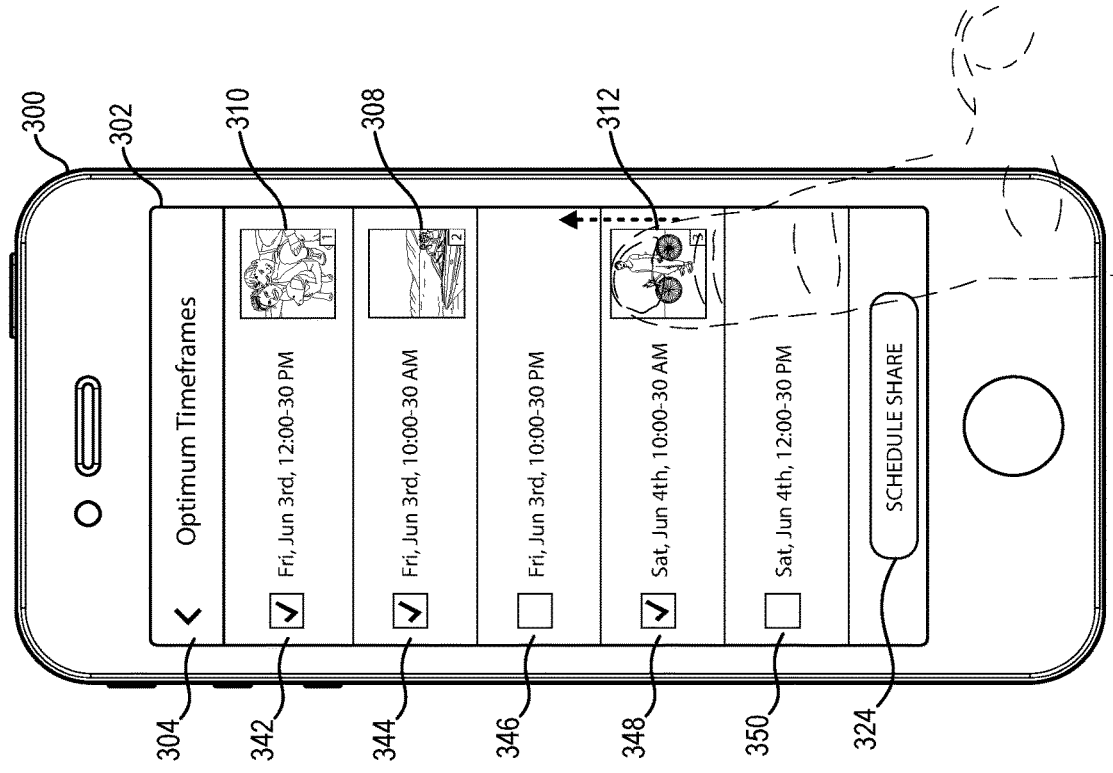
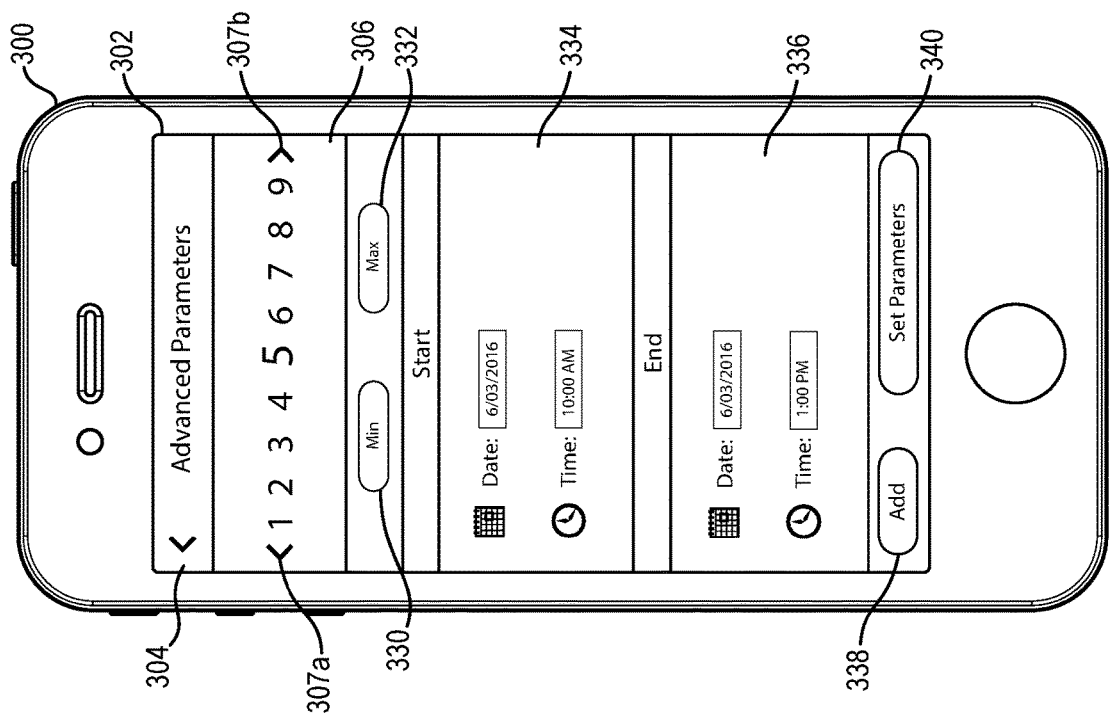
Fig. 3D
Fig. 3C

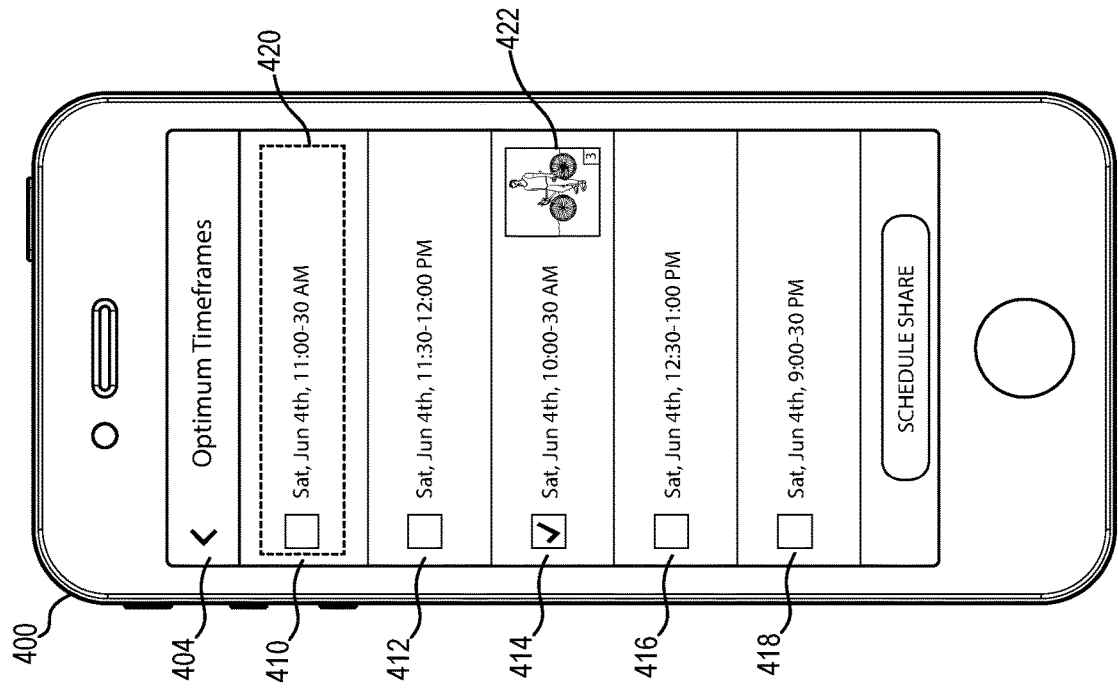
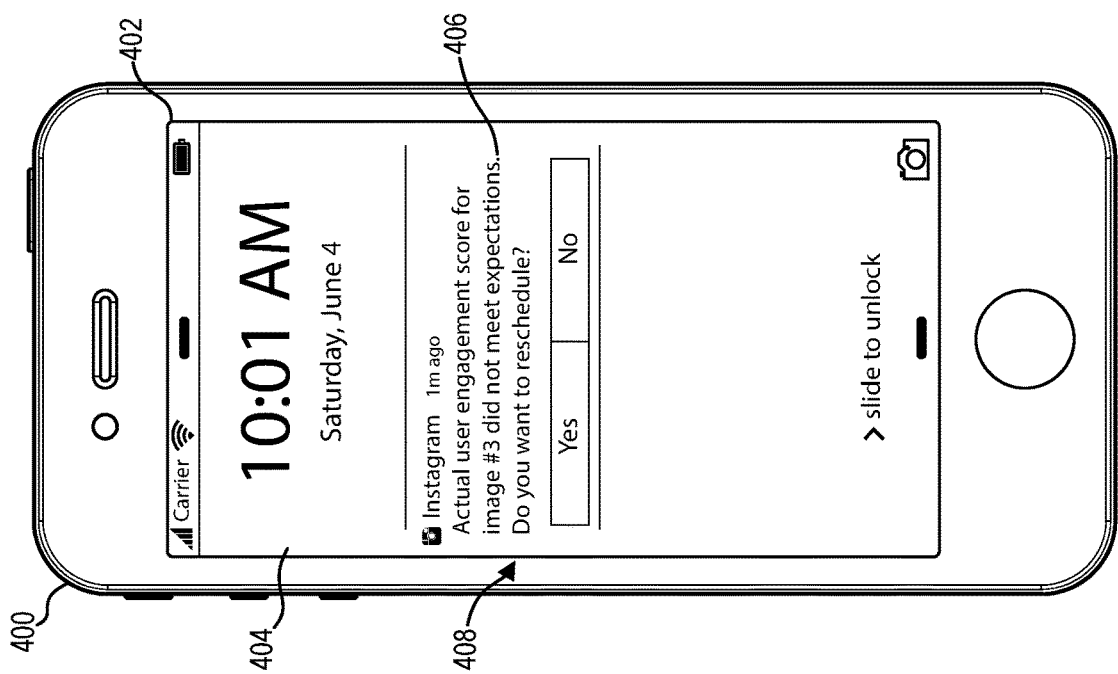
Fig. 4B
Fig. 4A

OPTIMIZING AUDIENCE ENGAGEMENT WITH DIGITAL CONTENT SHARED ON A SOCIAL NETWORKING SYSTEM

CROSS REFERENCE TO RELATED APPLICATIONS

N/A

BACKGROUND

People and organizations increasingly share and publish images, videos, and other digital content using social networking systems instead of print media or traditional broadcast television. Not only do friends, news organizations, and advertisers increasingly post and share content through social networking systems and other media sharing systems, but people often have more access to those systems through multiple devices connected to the Internet and other computer networks.

As one would expect, the amount of engagement (e.g., likes, comments, shares, views) that shared content receives is important to the users that share the content. However, conventional social networking systems provide interfaces with minimal flexibility concerning and control over increasing engagement with shared content. Most systems provide options for promoting or advertising content as a paid service only, which is not practical for most social networking system users. As a result, users that share content via social networking systems typically have very little data and very few options for maximizing user engagement with the content they share. For example, using a conventional interface for a non-commercial user of a social networking system, a user may post tens or hundreds of images from a vacation within a single post or individually post each image. That type of posting can overwhelm intended audience members with images or cause them to either ignore the content or selectively interact with a subset of posted digital content only.

Accordingly, conventional social networking systems suffer from limitations that prevent users from managing shared content items to optimize user engagement.

SUMMARY

This disclosure describes solutions to some or all of the foregoing problems with certain embodiments of systems and methods for optimizing user engagement with digital content shared through a social networking system. In accordance with some embodiments, the disclosed systems and methods schedule posts of digital content during timeframes that optimize user engagement. To do so, the systems and methods determine optimum timeframes for sharing the content by calculating and updating user engagement scores using data tracked by the social networking system. The systems and methods described herein include embodiments that allow a user of a social networking system to schedule when digital content items will be published (e.g., posted using the user's social networking account) based on calculated scores indicating the predicted levels of user engagement with the digital content items. For example, in accordance with some embodiments, the social networking system calculates predicted user engagement scores for each of a plurality of potential timeframes for posting the digital content, and then schedules the digital content to be posted during a timeframe having the highest calculated predicted user engagement score. In other words, embodiments of the disclosed invention improve a social networking system's ability to timely and strategically post digital content items in a way to maximize user engagement for the user that shares the digital content.

Some embodiments of the disclosed systems and methods track actual user engagement with shared digital content and adapt a schedule based on the actual user engagement. For example, the systems and methods can determine whether actual user engagement for a particular timeframe is more or less than predicted and then adjust a schedule for sharing digital content accordingly. For example, if actual user engagement is less than expected for a scheduled posting of a digital content item, the system can reschedule or prompt a user to reschedule the posting of the digital content item until a later time when user engagement is expected to be higher. These embodiments enable a user to dynamically schedule, post, and reschedule digital content items to optimize other users' engagement based on current data obtained through the social networking system.

In accordance with some example embodiments, a social networking system receives digital content items from a user of the social networking system to be posted using the user's account on the system. The social networking system then calculates, for each of the multiple timeframes, a score that represents a predicted engagement by other users of the system for the timeframe. The multiple timeframes may be part of a larger time period (e.g., a time period within which the user wants to post the provided digital content items). The system then schedules the received digital content items to be posted during timeframes with scores reflecting the highest predicted user engagement. For example, the system can schedule a first digital content item to be shared during a first timeframe based on the predicted user engagement score for the first timeframe indicating a prediction of high user engagement. The system can then track actual user engagement for the first timeframe prior to posting the first digital content item. For example, the system can calculate an actual user engagement score for the first timeframe and determine whether the actual user engagement score satisfies a threshold. If actual user engagement for the first timeframe meets a certain threshold, the system can post the first digital content item as originally scheduled. However, if actual user engagement for the first timeframe fails to meet the threshold, the system can modify the schedule accordingly (e.g., to delay posting the first digital content item until a later time or to post a different digital content item during the first timeframe).

The following description sets forth additional features and advantages of the present invention. Some of these additional features and advantages will be obvious from the description or may be learned by the practice of such exemplary embodiments. A person of ordinary skill in the art may realize and obtain the features and advantages of these embodiments through the systems and methods particularly pointed out in the appended claims.

BRIEF DESCRIPTION OF THE DRAWINGS

This disclosure will describe one or more embodiments of the invention with additional specificity and detail by referencing the accompanying figures. The following paragraphs briefly describe those figures.

FIGS. 2A-2D illustrate schematic diagrams showing an example of scheduling and rescheduling posts of digital content items to optimize user engagement in accordance with one or more embodiments.

FIGS. 3A-3D illustrate user interfaces including options and features for optimizing user engagement in accordance with one or more embodiments.

FIGS. 4A-4B illustrate additional user interfaces including notices, features, and options for optimizing user engagement in accordance with one or more embodiments.

DETAILED DESCRIPTION

Figure 1:
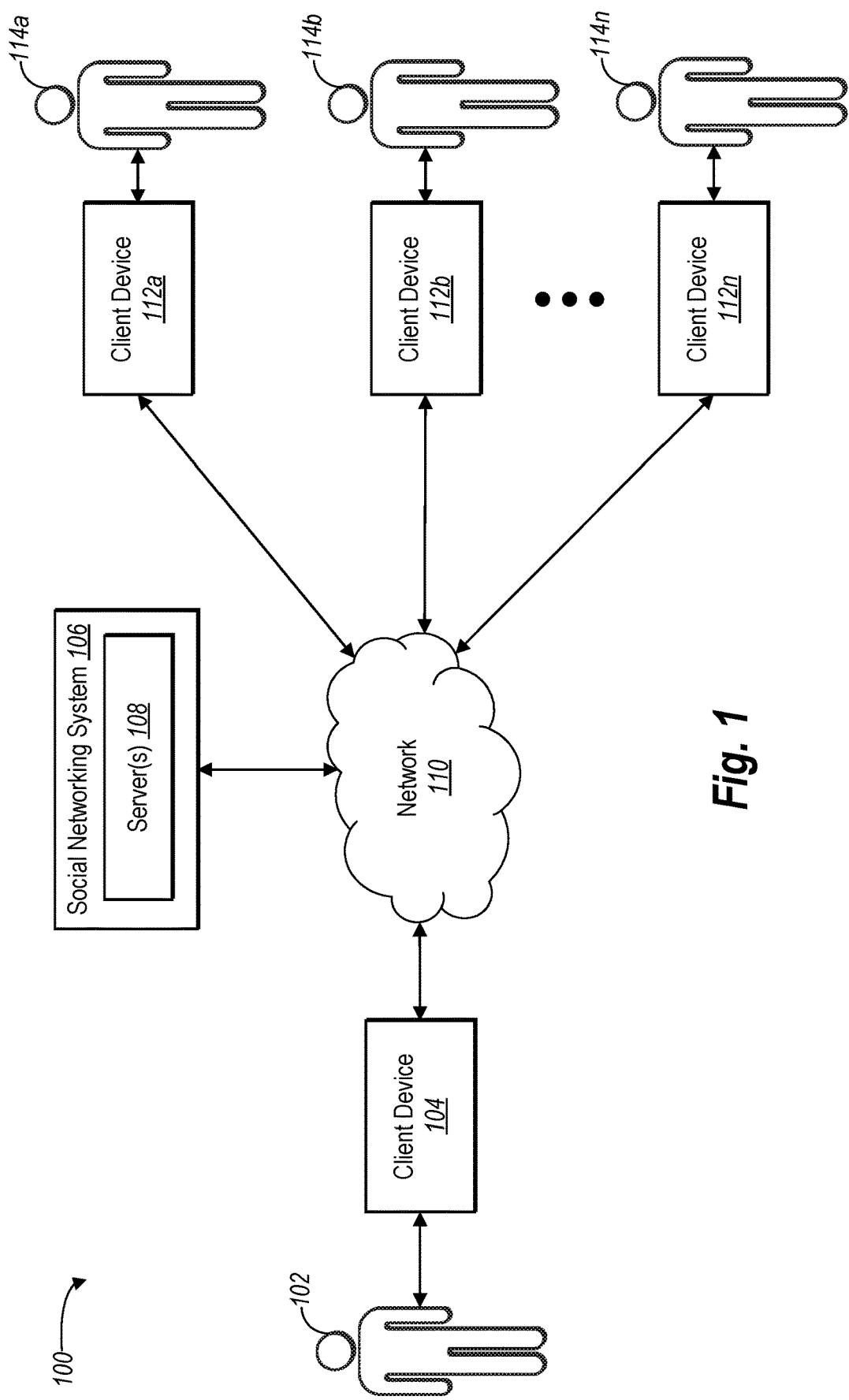
FIG. 1 illustrates a block diagram of a social networking system in accordance with one or more embodiments.

Certain embodiments of the disclosed invention comprise a system and corresponding methods that optimize user engagement with digital content shared by users of a social networking system. In accordance with some embodiments, the system optimizes user engagement by calculating predicted user engagement scores for digital content items to be shared by a user, and then scheduling the digital content items to be shared during timeframes having the highest predicted user engagement scores. The system can then continue to track user engagement on the social networking system and modify the schedule accordingly (e.g., based on actual user engagement scores and/or updated predicted user engagement scores). By so doing, the system assists the user in maximizing audience reach and user engagement with the user's shared content.

In one exemplary embodiment, the social networking system receives digital content items from a user of the social networking system to be posted through the user's social networking account (e.g., to be shared with the user's friends). The system calculates a score representing a predicted engagement by other users of the social networking system for each of multiple timeframes within a time period. The system then identifies a set of timeframes having the highest predicted user engagement scores and schedules the digital content items to be posted during these timeframes (e.g., where each digital content item is scheduled to be posted during a different timeframe in the set of timeframes). For a scheduled timeframe, the system then calculates a score representing actual user engagement (e.g., just before or during the timeframe) and determines whether the actual user engagement score satisfies a threshold. If the actual user engagement score satisfies the threshold, the system proceeds to post the digital content item as scheduled. However, if the actual user engagement fails to satisfy the threshold, the system then selectively reschedules the digital content item for another timeframe (e.g., if doing so would increase user engagement with the digital content item).

Among other things, the disclosed systems and methods improve a user's ability to manage posting digital content through a social networking system by giving the user more control over the timing and spacing of each post. Certain embodiments of the disclosed invention provide a user with an option to select a time period for posting multiple digital content items and receive a corresponding selection from the user for the time period. For example, a user may choose a time period consisting of days or weeks in which to post a group of digital content items. This time period selection enables a user to avoid overloading audience members with a post containing too many digital content items by spreading out the posting of digital content items.

As part of increasing the user's ability to manage postings, the disclosed systems and methods provide the user of a social networking system with tools to specify constraints for the post of digital content items. Those constraints, in some embodiments, specify the timing or predicted user engagement for a post. For example, certain embodiments of the disclosed invention allow a user, or the system, to set a threshold corresponding to a predicted user engagement score for a particular timeframe. This threshold provides a constraint (e.g., based on a desired user engagement) to set on the posting of digital content items. The threshold can specify a minimum user engagement, a maximum user engagement, or a range of user engagement that the system can then utilize for selecting when to schedule posts and/or whether to reschedule posts.

For example, a magazine or publisher may select a threshold for the predicted user engagement score under which the magazine or publisher would like to avoid posting a particular story or series of stories. In one embodiment, the system or method provides the user with a notice that the actual user engagement score for a particular timeframe is less than the system or method expected or fails to satisfy the provided threshold. Based on this determination, the system can automatically reschedule a post or provide the user with options to reschedule the post. In another embodiment, the system or method determines that the actual user engagement score for a particular timeframe satisfies the threshold and posts a particular digital content item during the particular timeframe as scheduled. These embodiments of the system ensure that certain desired levels of user engagement are achieved. Furthermore, the system empowers a user to control when to post particular digital content items and enables the user to set (or have automatically set) a threshold of user engagement for a post.

Certain embodiments also provide rescheduling and replacement options for posts through the user's account of the social networking system. In some of the embodiments, the system or method provides the user with rescheduling options for a particular post when, for example, the actual user engagement score for a timeframe is less than a threshold corresponding to a predicted user engagement score for that particular timeframe. The system or method automatically reschedules the post of a digital content item, in some embodiments, and provides a user with an option to reschedule a post, in other embodiments.

The system and method further include embodiments that provide a user with a notice and an option to schedule a post of a digital content item in the place of another digital content item based on, for example, a higher than expected actual user engagement score calculated by the system or method. For example, if an actual user engagement score is much higher for a particular timeframe, the system or user may choose to post a digital content item with a higher ranking during that particular timeframe (e.g., based on content analysis determining that a person is shown in, an event is described by, or a sharpness is particularly high for an image). Alternatively, in some embodiments, the system or method provides a user with an option to schedule multiple posts of digital content items during a timeframe with a higher than expected actual user engagement score. Using these notice and rescheduling features, the system is able to optimize user engagement as well as provide the user with better information, increased control, and greater flexibility—driven by the data and calculations of the social networking system.

In accordance with some embodiments, the disclosed systems and methods calculate a score representing a predicted engagement by other users of the social networking system for each of multiple timeframes within a time period. That predicted user engagement score relies on past user engagement data available to the social networking system, such as one or more time series representing past data collected by the social networking system. Each time series can have certain attributes that make the time series specific to, for example, certain types of collected data, certain types of digital content, certain users or types of users, certain geographic locations, etc. Accordingly, the system, when calculating a predicted user engagement score, selects a time series and/or data that is most closely related to one or more attributes of a post, for which the system is predicting user engagement, as will be described in more detail below.

In accordance with certain embodiments, the system calculates a predicted user engagement score by predicting, for each of multiple timeframes within a time period and based on one or more relevant time series, a number of audience members predicted to be available to consume content, an amount of content predicted to be available, or a propensity of each member of an audience to consume content. Some of the embodied systems and methods calculate a predicted user engagement score by calculating, for each timeframe within a time period, a predicted number of shares, a predicted number of comments, a predicted number of likes, a predicted number of views, a predicted number of reactions of an audience, and/or a prediction for any other user interactions for the timeframe. In some embodiments, the system identifies and applies a higher weight to predicted engagement (e.g., likes, shares, views, or comments) from "key influencers."

In some embodiments, the system calculates a predicted user engagement score and an actual user engagement score using the same or similar processes, calculations, and data. For example, after calculating a predicted user engagement score for a timeframe, the system can then calculate (e.g., during or just before the timeframe) an actual user engagement score for the timeframe by determining numbers of users (e.g., both general users and audience members) using the social networking system at that time, interactions (e.g., likes, comments, views, shares) by the users with digital content provided via the social networking system, and any other data being collected regarding usage of the social networking system or other activity (e.g., Internet browsing activity) of users of the social networking system. After calculating the actual user engagement score for the timeframe, the system can compare the actual user engagement score to the predicted user engagement score, dynamically reschedule posts of digital content if necessary, update stored time series with the newly collected data, and continue to train a user engagement model for more accurately predicting user engagement in the future. Indeed, according to some embodiments, the system calculates an updated predicted user engagement score for one or more remaining timeframes within a time period based in part on an actual user engagement score for a timeframe within the time period.

As described herein, the system provides advantages over conventional social networking systems and their corresponding interfaces. Specifically, the system provides an improved interface that displays data and options to the user to optimize user engagement with a post of digital content.

In some embodiments, the system also tracks and analyzes user engagement data—and presents updated recommendations and rescheduling options to a user—in a way that determines (or helps the user determine) when to post digital content in a more strategic way. Consequently, a user employing embodiments of the disclosed system can improve the reach of future digital content posts and avoid the content overload from a single user that often results from using conventional social networking systems.

Additionally, by providing options to schedule multiple images, videos, and other digital content based on tracked user engagement data and engagement thresholds, the system increases the flexibility and efficiency of conventional social networking systems. Some embodiments of the system increase flexibility by providing options to schedule, reevaluate, and reschedule a post of digital content based on tracked user engagement data, such as the number of potential audience members available to consume content. Some embodiments of the system increase efficiency by scheduling (and rescheduling) posts during times that account for the content load of the social networking system as a whole or for a particular location, such as scheduling a post based on an amount of content produced by users of the social networking system and available for consumption by potential audience members.

As used herein, the term "actual user engagement score" refers to a score representing actual engagement by users of a social networking system for a particular time. In some instances, the score may represent user engagement in real time. For example, in some embodiments, an actual user engagement score represents one or more factors for a particular time and location, such as a number of audience members available to consume content, an amount of content available for the audience members to consume, and current metrics regarding content consumption and corresponding interactions by users of the social networking system. These factors are merely exemplary and could be the basis for an actual user engagement score individually or in combination with other factors described below.

The term "audience member" refers to a user of a social networking system that could potentially view, like, share, comment, or otherwise react to or interact with a post of a digital content item. An audience member may include a person, organization, or other entity. In one example, an audience member could be a family member, a social networking connection or "friend", a friend of a friend, or a follower of a user who posted a digital content item. In other embodiments, an audience member can be any user of the social networking system that will have access to a social networking post. In some examples, a user is able to explicitly define an audience using privacy settings associated with the post.

The term "digital content item" refers to any digital image, photo, text, symbol, video, file, or link. The term further includes any item of digital content capable of posting to or sharing through a social networking system. A digital content item includes, for example, a video taken during a vacation, a news story published by a newspaper, or a downloadable file posted on the timeline of a social networking system.

The term "key influencer" refers to a person or organization who is followed or liked on a social networking system by an audience of interest to a user of the social networking system. For example, a key influencer may have hundreds or thousands of followers on a social networking system between the age of eighteen and thirty who live in the Northwestern United States. A key influencer may also frequently post digital content items, such as news stories or videos, that appear in the social feed of users who live in a particular state or region.

The term "predicted user engagement score" refers to a score representing a predicted engagement by users of the social networking system for a particular time. For example, a predicted user engagement score includes a score calculated by the social networking system to represent several factors for a particular time and location: a predicted reach, a predicted number of shares, a predicted number of comments, a predicted number of likes, a predicted number of views, and a predicted number of reactions of an audience. These factors are merely exemplary and could be the basis for a predicted user engagement score individually or in combination with other factors described below. A predicted user engagement score can be specific to a particular user, post, digital content item, geographic location, etc. In other embodiments, a predicted user engagement score can be more general and not tied to, for example, any particular user or digital content item. In some embodiments, the social networking system analyzes, weights, and/or combines different metrics or other data to generate the score. In further embodiments, the social networking system utilizes machine learning based on past data to train a user engagement prediction model and then utilizes the model to generate predicted user engagement scores for future timeframes, as discussed in more detail below.

The term "timeframe" refers to one or more portions of time within a larger time period. A timeframe could represent any portion of time. Moreover, a set of timeframes could include timeframes of different increments of a time period. In some embodiments, the system automatically determines the number and/or increment of timeframes. In other embodiments, a user customizes one or more aspects of the timeframes. As one illustrative example, the system could define a plurality of timeframes for a time period by breaking the time period into thirty-minute increments and then analyze each of the thirty-minute timeframes for potentially posting one or more digital content items. As a further illustration, the system could break a two-day time period into forty-eight, one-hour increments to utilize as the timeframes for the time period. The thirty-minute and one-hour timeframes are merely exemplary.

The term "time period" refers to an amount of time that can be broken down into multiple timeframes. For example, a time period could include any number of hours, days, weeks, months, and/or years. In some embodiments, a user provides input selecting or otherwise defining a time period for posting a plurality of digital content items. For example, the user could select a time period, within which the user wishes to post a plurality of digital content items by way of a social networking system. To illustrate, a time period may represent a specific four-day window, such as Nov. 24-27, 2016, during which a user wishes to post multiple digital images among the multiple time frames (e.g., 1-hour increments) of the four-day window.

The term "time series" refers to a sequence of data points from past timeframes or time periods. For example, a time series may comprise data points representing social networking information or activity for a social networking system (e.g., a number of users logged into the social networking system, a number of video views, a number of likes, a number of interactions with a mobile social networking app, a number of posts, etc.) for a group of users of the social networking system (e.g., all users of the social networking system, users within a certain geographic location, users within a particular audience, users within a particular group, connects of a particular user, etc.) for every time interval (e.g., every minute, every 10 minutes, every 30 minutes, every hour, every Monday, every weekend, every morning) for a period of time in the past (e.g., the past week, the past month, the past year, the past 10 years). For certain embodiments disclosed herein, a system relies on one or more time series to predict user engagement for a particular timeframe in the future. The system can selectively utilize and/or combine data from multiple time series to generate predicted user engagement scores in a customized way. For example, the system can calculate a universal predicted user engagement score and/or can calculate a predicted user engagement score that this specific to, for example, a particular digital content item, a particular user, a particular audience, and/or a particular geographic location. In some embodiments, the system calculates the predicted user engagement by predicting a number of audience members available to consume content for a particular timeframe and an amount of content expected to be available for consumption by the audience members during the particular timeframe. These factors are merely exemplary. A time series could be used to predict these or other factors individually or in combination, as described below.

Turning now to the figures, FIG. 1 illustrates a schematic diagram of one embodiment of an exemplary system environment 100 in which a posting management system can operate. As illustrated in FIG. 1, the environment 100 can include a user 102; a client device 104; a social networking system 106, including or implements on server(s) 108; a network 110; client devices 112a-112n; and other users 114a-114n of the social networking system 106. The client device 104, the client devices 112a-112n, the network 110, and the server(s) 108 may be communicatively coupled with each other either directly or indirectly (e.g., through the network 110). The client device 104, the client devices 112a-112n, the network 110, and the server(s) 108 may communicate using any communication platforms and technologies suitable for transporting data and/or communication signals, including any known communication technologies, devices, media, and protocols supportive of remote data communications, examples of which will be described in more detail below.

As illustrated in FIG. 1, the environment 100 can include the client device 104 and the client devices 112a-112n. The client device 104 captures, stores, or accesses digital content items that the user 102 intends to post through an account of the user on the social networking system 106. The other users 114a-114n of the social networking system use the client devices 112a-112n to view or otherwise access digital content items posted by the user 102 on the social networking system. In some embodiments of the disclosed invention, the other users 114a-114n comprise potential audience members for the digital content items posted by the user 102 to the social networking system 106. The client device 104 and the client devices 112a-112n may comprise any type of computing device. For example, the client device 104 and the client devices 112a-112n may comprise one or more personal computers, laptop computers, mobile devices, mobile phones, tablets, special purpose computers, TVs, or other computing devices. In one or more embodiments, the client device 104 and the client devices 112a-112n may comprise computing devices capable of communicating with each other or the social networking system 106. The client device 104 and the client devices 112a-112n may comprise one or more computing devices as discussed in more detail below.

As illustrated in FIG. 1, the client device 104, the client devices 112a-112n, and/or the server(s) 108 may communicate via the network 110. The network 110 may represent a network or collection of networks, such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 110 may be any suitable network over which the client device 104 or the client devices 112a-112n (or other components) may access the social networking system 106 or vice versa. The network 110 will be discussed in more detail below.

As further illustrated in FIG. 1, the environment 100 also comprises the social networking system 106, including the server(s) 108. The server(s) 108 of the social networking system 106 may generate, store, receive, and/or transmit any type of data, including digital content items. For example, the server(s) 108 may receive data from the client device 104 and send the data to the client device 112a. In one example, the server(s) 108 comprise a social networking server that can host a social network. In one or more embodiments, the server(s) 108 may comprise a data server. The server(s) 108 can also comprise a communication server or a web-hosting server. Regardless, the server(s) 108 can be configured to receive a wide range of electronic documents or communications, including but not limited to, text messages, instant messages, social networking messages, social networking posts, emails, tags, comments, and any other form of electronic communications or electronic documents. Additional details regarding the server(s) 108 will be discussed below.

Although FIG. 1 illustrates three client devices 112a-112n corresponding to the other users 114a-114n of the social networking system, the client devices 112a-112n can represent any number of computing devices (fewer or greater than shown). Similarly, although FIG. 1 illustrates a particular arrangement for the user 102, the client device 104, the social networking system 106 (including the server(s) 108), the network 110, the client devices 112a-112n, and the other users 114a-114n, additional arrangements are possible.

As indicated above, one or more users can be associated with each of the client device 104 or the client devices 112a-112n. Users may be humans, organizations, or any other entities. In some embodiments, the user 102 is an individual user, rather than an entity or organization. The user 102 and the other users 114a-114n may be connected through one or more social networks of the social networking system. For example, the user 102 and the other users 114a and 114b can be friends, or the other users 114a and 114b may be followers of the user 102 on the social networking system 106. Alternatively, the user 102 and one or more of the other users 114a-114n may have no direct relationship through the social networking system 106. The other users 114a-114n can represent a small number of users, such as two, or a large number of users, each user interacting with the social networking system 106 through a corresponding number of client devices 112a-112n. For example, the user 102 can interact with the client device 104 to post a digital content item through an account of the user 102 on the social networking system 106. The user 102 may interact with the client device 104 by way of a user interface on the client device 104 (e.g., within a browser or a mobile application running on the client device 104). The other user 114a can interact with the client device 112a to view, like, share, comment, or otherwise interact with the digital content item posted by the user 102. The other user 114a may interact with the client device 112a by way of a user interface on the client device 112a.

As a further example, in one or more embodiments, the social networking system 106 receives multiple digital content items from the client device 104 associated with the user 102. The user 102 interacts with the interface of the client device 104 to schedule posts of the multiple digital content items through her account on the social networking system 106. In one or more embodiments, the social networking system 106 receives the digital content items to be posted (e.g., through network 110), and then posts the digital content items to an account of the user 102 on the social networking system 106 (e.g., to a profile page associated with the user 102). The social networking system 106 can then provide the digital content items to one or more of other users 114a-114n by, for example, including the digital content items within newsfeeds associated with each of users 114a-114n, which can then be accessed using client devices 112a-112n, respectively. As mentioned above and as will be disclosed in more detail below, the social networking system 106 can control the scheduling of when to share the digital content items with users 114a-114n in order to optimize user engagement with the digital content items.

In further illustration of this example, the social networking system 106 can track and detect interactions by users 114a-114n with the digital content items shared by user 102. For example, the social networking system 106 detects interactions by the client devices 112a-112n with posts comprising digital content items posted by the user 102. These detected interactions include, for example, views, shares, comments, likes, clicks, reactions, or other interactions with the posts and/or corresponding digital content items. The social networking system 106 tracks and stores the detected interactions in one or more databases (not shown) and uses the detected interactions to determine user engagement as well as to predict future user engagement.

For example, as described further below, the social networking system 106 calculates a score representing a predicted engagement by the other users 114a-114n of the social networking system for each of a plurality of timeframes within a time period for posting digital content items from user 102. The social networking system 106 can use the calculated predicted user engagement scores to schedule a post of each of the digital content items during timeframes having the highest predicted user engagement scores. To illustrate, the social networking system 106 can schedule a first post of a first digital content item within a first timeframe based on a predicted user engagement score for the first timeframe. Thereafter, just before or during the first timeframe and before posting the first digital content item, the social networking system 106 can calculate a score representing actual engagement by the other users 114a-114n of the social networking system for the first timeframe. Using the actual user engagement score for the first timeframe, the social networking system 106 can then determine whether to post the first digital content item as schedule or to reschedule posting the first digital content item for a later time. In doing so, the social networking system 106 can compare the actual user score to a threshold. The threshold can be an independent user engagement threshold (e.g., indicating a minimum required user engagement score independent of any other scores) or can be dependent on the predicted user engagement score for the first timeframe (e.g., indicating a range around the first predicted user engagement score). In some embodiments, if the actual user engagement score satisfies the threshold, the social networking system 106 posts the first digital content item during the first timeframe as originally scheduled. However, if the actual user engagement score fails to satisfy the threshold, the social networking system 106 must then make a determination of whether to reschedule the first digital content item for a later time, as described in more detail below.

The disclosed invention may be implemented in whole, or in part, by the social networking system 106. For example, in some embodiments, the social networking system 106 performs most, if not all, of the processes described herein. In additional or alternatively embodiments, the client device 104 may perform and/or facilitate one or more steps of the processes disclosed herein. For example, the client device 104 can allow the user 102 to provide digital content items to the social networking system 106 and/or provide user input indicating the user's preferences or choices of when to share the digital content items with other users.

Turning now to FIGS. 2A-2D, these figures and the following description provide additional detail concerning the social networking system 106 and its calculations, scheduling, posting, and other functions for managing posts of multiple digital content items. FIG. 2A illustrates a schematic diagram of a table representing some of the functions of the social networking system 106, including but not limited to the calculation of predicted user engagement scores for a plurality of timeframes within a time period and the scheduling of posts of digital content items. Some of the functions performed by the social networking system 106 correspond to columns in the table 200, with column 204 representing predicted user engagement scores, column 206 representing actual user engagement scores, column 208 representing scheduled posts, column 210 representing scheduled digital content items, and column 212 representing digital content item ranks. As described in the following paragraphs and as depicted in FIGS. 2A-2D, the social networking system 106 (e.g., utilizing server(s) 108) performs functions corresponding to each of columns 202-212 in one or more embodiments of the disclosed invention. Alternatively, the client device 104 could perform all or some of the described functions. For illustrative purposes, however, this disclosure will primarily describe the social networking system 106 performing the functions corresponding to columns 202-212.

In one or more embodiments, the social networking system 106 calculates a predicted user engagement score for each of a plurality of timeframes (depicted as "Timeframe 1" through "Timeframe 10") within a time period 214. The time period 214 may equal any amount of time, including but not limited to minutes, hours, days, months, or years. The time period 214 typically includes multiple timeframes that all together equal the amount of time of the time period 214. As an example, the time period 214 might equal five hours and comprise ten thirty-minute timeframes. As shown in FIG. 2A, the social networking system 106 has calculated a predicted user engagement score for each of the ten timeframes within the time period 214. The predicted user engagement scores in column 204 include a high score of 115 corresponding to the seventh timeframe and a low score of 62 corresponding to the tenth timeframe. These predicted user engagement scores are merely representative and could take any numeric or symbolic format with any suitable value ranges.

The social networking system 106 calculates a predicted user engagement score for each timeframe based on one or more factors, some or all of which are tracked by the social networking system 106. The following paragraphs describe factors that the social networking system 106 can use individually or in combination, including any possible combination of factors, to calculate a predicted user engagement score. In some embodiments, for example, the social networking system 106 calculates a predicted user engagement score based on a number of audience members predicted to be available to consume content or a percentage of audience members predicted to be available to consume content. The number or percentage of audience members can reflect, in some embodiments, a number or percentage of audience members at a particular time of day or at a particular location. The number or percentage of audience members may further comprise or relate to specific groups defined by demographic or profile information. In some embodiments, that demographic or profile information is stored within databases of the social networking system 106.

The audience members of interest to a user (e.g., user 102) may, for example, be other users (e.g., users 114a-114n) of the social networking system 106 who are friends with or followers of the user on the social networking system 106. As another example, audience members of interest to the user may be users of the social networking system between the ages of eighteen and thirty in a region of China, the United States, Australia, or some other country. As yet another example, some or all of the audience members may be key influencers who frequently post, share, like, comment, or react to digital content items similar to the digital content items to be posted by the user. The predicted number or percentage of these audience members in the examples set forth in this paragraph (or for any other defined group of users) may comprise a number or percentage of audience members predicted to be available to consume content (e.g., active on the social networking system 106) during a specific timeframe in the future, such as during 7:30-8:00 p.m. Eastern Standard Time on Tuesday, Dec. 31, 2024.

In one or more embodiments, the social networking system 106 calculates a predicted user engagement score based on relationships between or among potential audience members or based on activities performed by potential audience members. For example, in certain embodiments, the social networking system 106 calculates a predicted user engagement score based on current relationships between the user and the other users of the social networking system, including but not limited to the relationship of friends, close friends, friends of friends, family members, acquaintances, or followers recognized by social networking system 106. In one or more embodiments, the social networking system 106 calculates a predicted user engagement score based on activities performed by potential audience members on a social networking system, such as viewing videos or posts; commenting on, liking, clicking on, or sharing a post; or superimposing an overlay on a profile picture, such as a flag overlaying a personal profile picture.

In certain embodiments, the social networking system 106 calculates the number, percentage, activities, or relationships of audience members (or any other factor used to calculate a predicted user engagement score) based on historical or current data concerning users of the social networking system 106. In some embodiments, this historical or current data may be stored within databases of the social networking system 106. The data may comprise, for example, profile information concerning a particular user or group of users of the social networking system 106; past posts, views, likes, comments, shares, or other reactions to digital content items by individual users or users within a particular demographic within a given time period; relationships between or among users of the social networking system 106; or aggregate numbers of users logged into accounts of the social networking system 106. A person having skill in the art will recognize that social networking system 106 can track many other types of data concerning its users and factor this data into the predicted user engagement score.

In some embodiments, the server(s) 108 calculate a predicted user engagement score based on various time series. The time series in some embodiments comprise data points of historical data over a continuous time period. For example, the server(s) 108 in some embodiments calculate a predicted user engagement score by predicting, for a particular timeframe or for multiple timeframes, a number of audience members predicted to be available to consume content based on a time series or multiple time series. In this example, the time series may comprise data points representing the number of friends, family members, friends of friends, or followers (of the user) who logged into an account over a three-year time period, with data points corresponding to every thirty-minute timeframe. In another example, the social networking system 106 calculates a predicted user engagement score by predicting an amount of digital content items predicted to be available for audience members to consume based on a time series. In this example, the time series may comprise data points representing the total number of digital content items posted by friends, family members, friends of friends, or profiles followed by (or of) the user over a two-year time period, with data points corresponding to every one-hour timeframe. In yet another example, the social networking system 106 in some embodiments calculates a predicted user engagement score by predicting, for a particular timeframe or for multiple timeframes, a propensity of each member of an audience to consume content based on a time series. In this example, the time series may comprise data points representing the number of views, likes, shares, comments, reactions, or other interactions by friends or followers of the user 102 over a one-year time period, with data points corresponding to every one-hour timeframe.

In some embodiments, the social networking system 106 calculates a predicted user engagement score based on content, events, or activity related to (or that have a potential effect on) digital content items to be posted by a user. For example, the social networking system 106 in some embodiments calculates a predicted user engagement score by calculating an amount of content produced by one or more of the other users of the social networking system and that are available for consumption by potential audience members of the user. In some instances, one or more of the other users may target audience members that overlap with the audience members of interest to the user 102. A news organization or magazine, in one non-limiting example, may have recently posted multiple digital content items, such as images or news stories concerning a recent event, that are heavily shared or commented on by the other users of the social networking system 106 between the ages of thirty and thirty-five in a particular location, some of whom are friends, family members, or followers of the user. The digital content items to be posted by the user may directly relate to (or have no relationship with) the digital content items posted by the news organization or magazine. The digital content items posted by the news organization or magazine may affect the predicted user engagement score for timeframes during which the user intends to post particular digital content items. Similarly, a recent event or upcoming event detected by the social networking system 106, such as results of a presidential election or a sporting event, may also affect the predicted user engagement score timeframes during which the user intends to post particular digital content items.

In some embodiments, the social networking system 106 calculates a predicted user engagement score based on a relationship between the digital content items to be posted by a user and events, news, topics, or other digital content items posted (or commented about) on the social networking system. For example, the social networking system 106 applies automatic content analysis to a text or image of a digital content item to be posted by the user, in some embodiments, to determine a similarity between the digital content item and other digital content items posted on the social networking system 106 with a large number of views, likes, shares, comments, or other reactions. The stronger the similarity between the digital content item and the other digital content item (with a large number of views, likes, shares, comments, or other reactions), the higher the predicted user engagement score will be for the digital content item. The automatic content analysis, in some embodiments, also analyzes the text of a digital content item to be posted by the user to determine whether the text contains keywords or similar words to events, news, or topics in posts with a large number of views, likes, shares, comments, or other reactions.

When calculating a predicted user engagement score based on some or all of the factors described above, the social networking system 106 in some embodiments employs machine learning models. For example, the social networking system 106 in certain embodiments uses machine learning models to predict the likelihood and extent that digital content items to be posted by a user (or by the other users) will be consumed at a particular location or by a subset of the other users. In some embodiments, that consumption may take the form of views, likes, shares, comments, or other reactions to digital content items. The machine learning models in some embodiments employ social signals to predict, for example, the likelihood that digital content items to be posted by the user (or by other users) will be consumed at a particular location or by a subset of the other users. The social signals comprise data such as the number of likes or shares of a user's posts or the number of mentions of a particular topic or keyword, or the number of mentions or followers a user or profile on the social networking system 106.

Additionally or alternatively, the social networking system 106 can assign a weight to one or more of the factors described above when calculating the predicted user engagement score. For example, the social networking system 106 may calculate a predicted user engagement score for a particular timeframe and for a particular digital content item to be posted by a user by calculating the following three factors: the number of audience members predicted to be available to consume content, the amount of digital content items available for the audience members to consume, and the number of digital content items posted on the social networking system within the last week that contain the same or similar keywords as those in the digital content item to be posted.

The social networking system 106 may then assign a weight to each of these three factors to increase or decrease the importance of any individual factor. For example, the social networking system 106 can assign a weight of 0.025 to the number of audience members predicted to be available to consume content, a weight of 0.020 to the amount of digital content items available for the audience members to consume, and a weight of 0.030 to the number of digital content items posted on the social networking system within the last week that contain the same or similar keywords as those in the digital content item to be posted. This weight distribution is merely exemplary. A person having ordinary skill in the art will recognize that any set or kind of weight may be assigned to any number or combination of factors.

As indicated in column 208 of FIG. 2A, once the social networking system 106 has calculated the predicted user engagement scores, the social networking system 106 schedules when to post multiple digital content items. For example, in the embodiment shown in FIG. 2A, the user 102 has three digital content items (image 001, image 002, and image 003) to be posted through her account on the social networking system 106. The social networking system 106 schedules a post for each of the three images during the three timeframes with the highest predicted user engagement scores, that is, the third timeframe with a predicted user engagement score of 90, the fifth timeframe with a predicted user engagement score of 100, and the seventh timeframe with a predicted user engagement score of 115. Accordingly, column 208 contains the letter "S" in the rows corresponding to the third timeframe, the fifth timeframe, and the seventh timeframe, to indicate that a post has been scheduled for each of these timeframes.

Alternatively, the social networking system 106 could schedule a post of each of the three images during the timeframe with the single highest predicted user engagement score—the seventh timeframe. In another embodiment, the social networking system 106 could schedule a post of two of the three images (image 002 and image 003) during the timeframe with the single highest predicted user engagement score, the seventh timeframe, and schedule a post of one of the three images (image 001) during the timeframe with the next highest predicted user engagement score, the fifth timeframe. Moreover, depending on the length of a time period and a number of digital content items to be posted, the number of timeframes could be more than, less than, or equal to the number of digital content items to be posted.

In some embodiments, the social networking system 106 determines when to schedule a plurality of digital content items schedule based in part on a ranking of each digital content item. The social networking system 106 may rank the digital content items (e.g., based on user input or based on an analysis of the digital content items), depending on the embodiment. As shown in column 212 of FIG. 2A, the social networking system 106 has ranked image 001 third, image 002 second, and image 003 first. For example, the social networking system 106 may determine a ranking of each digital content item using automatic content analysis. In accordance with the content analysis, the social networking system 106 may, for example, analyze and rank each image from a plurality of images based on detecting the sharpness, light contrast, or presence of a person or facial features in the image, such as detecting the presence of a smile in an image. A person of ordinary skill in the art will recognize that automatic content analysis (or in the prior example, more specifically, automatic image analysis) may base its analysis of content on other factors, including but not limited to the presence of keywords in the text of a digital content item as described above. Alternatively, in some embodiments, the server(s) 108 provide the user 102 with an option to adjust the ranking provided by the social networking system 106 or to rank the digital content items without input from the social networking system 106.

Certain embodiments of the social networking system 106 further provide an option to a user to select a number of digital content items to be posted within a timeframe or time period. In some embodiments, the selected number represents a minimum number, maximum number, or specific number to be posted within a timeframe or time period. For example, the social networking system 106 may provide the user with an option to choose a certain number of received images within a time period comprising a plurality of timeframes. As shown in column 210 of FIG. 2A, the user has selected to have three images posted through her account within the time period 214.

Turning now to FIG. 2B, this figure and the following description provide additional detail regarding the functions of an example of the social networking system 106. In one or more embodiments of the social networking system 106, the system calculates actual user engagement scores during or just before each timeframe. As shown in column 206 of FIG. 2B, the social networking system 106 has calculated an actual user engagement score for three of the ten timeframes, the first timeframe, second timeframe, and third timeframe. In certain embodiments, the social networking system 106 calculates an actual user engagement score for a particular timeframe just before the beginning of the timeframe or during the timeframe. In an alternative embodiment, the social networking system 106 can calculate an actual user engagement score for a particular timeframe at multiple times during the particular timeframe (e.g., and then average the scores for the timeframe). By calculating the actual user engagement score, the social networking system 106 can determine what the actual user engagement is on the social networking system 106 at that particular time and then utilize this information to adjust a post schedule if necessary.

In one or more embodiments, the social networking system 106 calculates an actual user engagement score based on any factor used as a basis to calculate a predicted user engagement score, as described above, except that the social networking system 106 performs the calculation sometime just before or during a particular timeframe. Similar to when calculating a predicted user engagement score, the social networking system 106 use these factors individually or in combination, including any possible combination of factors, to calculate an actual user engagement score. As with calculating a predicted user engagement score, in some embodiments, a client device could calculate an actual user engagement score or perform all or some of the other functions performed by the social networking system 106.

The factors used by the social networking system 106 to calculate an actual user engagement score include, but are not limited to, a number of audience members available to consume content; a percentage of audience members available to consume content; relationships between or among potential audience members; activities performed by potential audience members; an amount of digital content items available for audience members to consume; a propensity of each member of an audience to consume content; content, events, or activity related to (or that have a potential effect on) digital content items to be posted; or a relationship between the digital content items to be posted by a user and events, news, topics, or other digital content items posted (or commented about) on the social networking system. As with calculating a predicted user engagement score, the social networking system 106 may use time series, social signals, automatic content analysis, and machine learning models to calculate an actual user engagement score.

Some or all of the factors used to calculate an actual user engagement score may be estimated, in some embodiments, rather than calculated to a numerical certainty. When calculating the amount of digital content items available for audience members to consume, for example, the social networking system 106 in some embodiments calculate the amount of digital content items available by estimating the amount based on a time series, as described above. Additionally, the actual user engagement score may include factors that represent predictions rather than quantifications, such as predicting the likelihood that digital content items will be consumed by a particular subset of users. As described above, the social networking system 106 may use machine learning models in some embodiments and social signals to predict the likelihood that digital content items to be posted by the user (or by other users) will be consumed at a particular location or by a subset of other users. By allowing the actual user engagement score, in some embodiments, to include factors that are predictions, the social networking system 106 can more easily compare a predicted user engagement score with an actual user engagement score on the same scale.

Additionally, in some embodiments, the social networking system 106 maintains (or has access to) a repeatedly updated tally of audience members currently available to consume content and a repeatedly updated tally of digital content items available for audience members to consume. The social networking system 106 updates the tally at set intervals, such as every five seconds. In some embodiments, the tally is specific to a subset of the other users (e.g., an identified audience for digital content to be posted), such as a tally of the number of family members, friends, friends of friends, acquaintances, followers, or users who liked a profile page of the user sharing the digital content. In some embodiments, the tally is specific to a location, such as the number of digital content items available for audience members in a region of the United States to consume.

In certain embodiments, the social networking system 106 determines (or receives a selection of) a threshold corresponding to a predicted user engagement score. In some embodiments, the social networking system 106 provides an option to the user to select a threshold for a desired user engagement. In other embodiments, the social networking system 106 automatically determines the threshold based on historical data of user engagement, default settings, or average selections by users, for example. In certain embodiments, the threshold is a number equal to the predicted user engagement score for a particular timeframe or, alternatively, a numerical range above and/or below the predicted user engagement score for a particular timeframe. The range may also be unequally distributed, with the range above the predicted user engagement score greater than the range below the predicted user score for a particular timeframe, including no range below the predicted user engagement score. For instance, the threshold for the third timeframe in column 204 of FIG. 2B may extend from twenty-five points above the predicted user engagement score to five points below the predicted user engagement score.

The social networking system 106 likewise determines, in some embodiments, whether an actual user engagement score for a particular timeframe satisfies a threshold corresponding to a predicted user engagement score for the particular timeframe. When the social networking system 106 determines or receives a selection of a threshold equal to the predicted user engagement score, for example, the social networking system 106 determines whether the actual user engagement score for a particular timeframe is equal to the predicted user engagement score for the particular timeframe. If the actual user engagement score does not equal the predicted user engagement score in this example, the actual user engagement score does not satisfy the threshold.

Alternatively, when the social networking system 106 determines or receives a selection of a threshold with a range above and below the predicted user engagement score, for example, the social networking system 106 determines whether the actual user engagement score is within, less than, or more than the range for the predicted user engagement score for a particular timeframe. If the actual user engagement score is less or more than the range for the predicted user engagement score, in this example, the actual user engagement score does not satisfy the threshold.

In one or more embodiments, the social networking system 106 also determines whether to reschedule a post of a particular digital content item (or multiple digital content items). In some embodiments, the social networking system 106 determines whether to reschedule a post in response to determining whether an actual user engagement score for a particular timeframe satisfies a threshold corresponding to a predicted user engagement score for the particular timeframe. When determining whether to reschedule a post, the social networking system 106 in some embodiments compares an expected loss of user engagement for a particular digital content item, if posted during a particular timeframe, with an expected gain of user engagement for the digital content item, if posted during a later timeframe. That comparison may be, in some instances, between an actual user engagement score for a particular timeframe and a predicted user engagement score for a later timeframe.

When determining whether to reschedule a post, the social networking system 106 may determine to post a particular digital content item during the scheduled timeframe (or provide the user with an option to confirm the post during the scheduled timeframe) if, for example, the actual user engagement score for the particular timeframe satisfies or exceeds the threshold. Conversely, the social networking system 106 may determine to reschedule a post (or provide the user with an option to reschedule the post) if, for example, the actual user engagement score for the particular timeframe does not satisfy the threshold by being less or more than the threshold corresponding to the predicted user engagement score.

As shown in column 208 of FIG. 2B, for example, the social networking system 106 has rescheduled (automatically or based on user input) the post of image 001 from the third timeframe to the fourth timeframe. In this example, the social networking system 106 rescheduled the post of image 001 to the fourth timeframe, instead of the third timeframe, in response to determining that the actual user engagement score of 85 for the third time period did not satisfy a threshold corresponding to the predicted user engagement score of 90 for the third timeframe. In this example, the user 102 may have selected a threshold with a range of three points below and fifteen points above the predicted user engagement score. Accordingly, the actual user engagement score of 85 for the third timeframe shown in column 206 of FIG. 2A does not satisfy that threshold.

Alternatively, the social networking system 106 may have determined to reschedule the post of image 001 to the fourth timeframe based on a comparison between the actual user engagement score of 85 for the third timeframe and an updated predicted user engagement score of 92 for the fourth timeframe. In this example, the expected gain of two points in the predicted user engagement score for image 001 (for the fourth timeframe) provided an incentive to avoid the expected loss of five points in the actual user engagement score for image 001 (for the third timeframe).

In some embodiments, the social networking system 106 calculates updated predicted user engagement scores for timeframes during the time period 214. For example, as shown in column 206 of FIG. 2B, the social networking system 106 has calculated actual user engagement scores for the first, second, and third timeframes. In this example shown in FIG. 2B, the social networking system 106 may have detected an upward trend in user engagement based on the calculation of the actual user engagement scores for the first, second, and third timeframes. Alternatively, the social networking system 106 may have also determined that image 001 depicts an object, such as a city, that is increasingly mentioned in comments or shares by the other users following some breaking news. With this and any other new data available, the social networking system 106 calculates updated predicted user engagement scores for the fourth through tenth timeframes, as shown in column 204 of FIG. 2B.

In some embodiments, the social networking system 106 actively tracks the factors that form the basis for both the predicted user engagement scores and actual user engagement scores. By actively tracking these factors, the social networking system 106 can determine to calculate an updated predicted user engagement score based on any changes in the factors. Furthermore, the social networking system 106 can utilize new data and machine learning techniques to continuously train a user engagement scoring model in order to improve the accuracy of the model, and then update predicted user engagement scores using the increasingly accurate scoring model.

Turning now to FIG. 2C, this figure indicates that the social networking system 106 also posts digital content items received from a user according to a schedule. As indicated by column 208 of FIG. 2C, the social networking system 106 posted image 001 during the fourth timeframe, which the social networking system 106 calculated to have an actual user engagement score of 91. The letter "C" appears in column 208 to indicate that the post of image 001 has been completed. In some embodiments, the social networking system 106 automatically posts digital content items as scheduled when the actual user engagement score for a particular timeframe satisfies the threshold corresponding to the predicted user engagement score. Continuing the example from above, the social networking system 106 or the user may have selected a threshold with a range of three points below and fifteen points above the predicted user engagement score. Accordingly, the actual user engagement score of 91 for the fourth timeframe shown in FIG. 2C satisfied the selected threshold corresponding to the updated predicted user engagement score of 92 for the fourth timeframe.

In some embodiments, the social networking system 106 tracks and compares the actual user engagement scores with the predicted user engagement scores for some or all of the timeframes. As shown in columns 204 and 206 of FIG. 2C, the social networking system 106 has tracked both the actual and predicted user engagement scores for the first, second, third, and fourth timeframes. By tracking and comparing the actual and predicted user engagement scores, the social networking system 106 gathers data to improve future predicted user engagement scores. For example, in some embodiments, the social networking system 106 employs machine learning models to improve the accuracy of the predicted user engagement scores by analyzing the differences between (or among) factors underlying the predicted user engagement score and actual user engagement score for a particular timeframe.

Turning now to FIG. 2D, in some embodiments, the social networking system 106 determines to reschedule the post of digital content items for particular timeframes based on a comparison of digital content item rankings and predicted or actual user engagements scores. As shown in FIG. 2D, for example, the social networking system 106 has rescheduled image 003 to post during the fifth timeframe, instead of the seventh timeframe, and rescheduled image 002 to post during the seventh timeframe, instead of the fifth timeframe. The social networking system 106 determined to reschedule image 003, in this example, because it was ranked first out of the three images. Moreover, after calculating an actual user engagement score for the fifth timeframe, the actual user engagement score of 150 for the fifth timeframe significantly exceeded the predicted user engagement score of 99 for the fifth timeframe. In some embodiments, such as this example, the social networking system 106 reschedules (or receives a selection from the user 102 to reschedule) a post in order to post the highest ranked digital content items during timeframes with the highest predicted or actual user engagement scores. By matching the highest ranked digital content items with the highest predicted or actual user engagement scores, the social networking system 106 optimizes user engagement.

Alternatively, the social networking system 106 determines, in some embodiments, to optimize user engagement by posting multiple digital content items during timeframes with the highest predicted or actual user engagement scores. For example, in FIG. 2D, the social networking system 106 alternatively could have scheduled a post of both image 002 and image 003 during the fifth timeframe after determining that the actual user engagement score for the fifth timeframe exceeded the predicted user engagement score. In some embodiments, the social networking system 106 provides a user with a notice that an actual user engagement score for a particular timeframe has exceeded (or fallen below) the predicted user engagement score. The social networking system 106 further provides the user with an option to reschedule the post of one or more digital content items during that particular timeframe in connection with the notice. These notices and options will be further discussed below in connection with FIG. 4A.

Turning now to FIGS. 3A-3D, these figures and the following description provide additional detail regarding scheduling and managing posts of digital content items using the social networking system 106. FIG. 3A illustrates a computing device 300 (i.e., a mobile device) having a display screen 302 showing a post management interface 304. The post management interface 304 facilitates the display, scheduling, and posting of digital content items. In particular, the post management interface 304 facilitates the display of digital content items selected or produced by a user of the computing device 300 for posting through an account of the user on a social networking system.

The post management interface 304 further allows a user to select a time period to schedule the post of digital content items during the selected time period. The post management interface 304 displays several features and options that facilitate the scheduling and posting of digital content items, including a content display window 306, a tagging option 314, a location identifier option 316, a time period selector 318, a time period display 319, an advanced time period option 320, a share now option 322, and a schedule share option 324. Each of these features and options will be discussed further below.

As illustrated in FIG. 3A, the content display window 306 displays digital content items that a user of a social networking system has selected or produced for posting on the social networking system. A user may select digital content items from various locations. For example, a user may select digital content items from a library or a file folder (not shown) stored on the computing device 300, from the Internet, or from another computing device connected to the computing device 300 through a wired or wireless connection. A user may also produce digital content items to be posted by, for example, capturing a photograph or recording a video using a camera 301 of the computing device 300. Accordingly, the content display window 306 displays both digital content items that the user of the computing device 300 selected or produced to be posted on the webpages of the social networking system.

As indicated above, the social networking system 106 allows a user to select different types and numbers of digital content items for posting. The content display window 306 of FIG. 3A displays three images (that is, images 308, 310, and 312) that a user has selected for posting. Alternatively, the content display window 306 could display (and the user could select) any other form of digital content item, including but not limited to photographs, symbols, videos, files, or links. Additionally, while the content display window 306 displays three images, a user can interact with the post management interface 304 by using a touch gesture, a click, or other operation, for example, to view additional images, videos, or other digital content items. In FIG. 3A, for example, direction arrows 307a and 307b indicate that a user may view additional digital content items by swiping left or right within the content display window 306 or by selecting the direction arrow 307a or 307b.

As also indicated above, in some embodiments, the social networking system 106 applies automatic content analysis to digital content items. In certain embodiments, that analysis applies to digital content items displayed in the content display window 306. For example, in some embodiments, the social networking system 106 applies automatic content analysis to images 308, 310, and 312 to determine a similarity between these three images and other digital content items posted on the social networking system with known numbers of views, likes, comments, shares, or other reactions. For example, the social networking system 106 may detect that image 308 is similar to other images of speed boats on lakes, such as a previous post by the same user of an image of a speed boat on Lake Tahoe. The social networking system 106 can then analyze user engagement with the past post to inform a predicted user engagement for image 308.

In some embodiments, the automatic content analysis detects objects, people, or locations that are shown or identified in the digital content items or that are described in metadata associated with the digital content items. For example, with respect to FIG. 3A, the social networking system 106 may apply automatic content analysis to detect the identity of the two people shown in image 310, the object in the left-hand corner of image 310 (as a dog), and the location at which image 310 was taken. As described below, some embodiments of the social networking system 106 rely on the results of automatic content analysis to rank digital content items and calculate predicted or actual user engagement scores.

As noted above, some embodiments of the social networking system 106 rank (or allow a user to rank) digital content items. The content display window 306 of FIG. 3A shows an example of the results of such ranking. The lower right-hand corner of each image in the content display window 306 contains a box with the number "1," "2," or "3." These numbers indicate that the social networking system 106 or the user 102 has ranked image 310 first, image 308 second, and image 312 third in order of importance to the user or probability of eliciting user engagement.

In some embodiments, the social networking system 106 ranks (or suggests a rank to the user for) each selected digital content item based on the results of automatic content analysis. In FIG. 3A, for example, the social networking system 106 has ranked image 310 first based in part on the automatic content analysis detecting the identities of the two people and one of the objects (as a dog) shown in image 310 and recognizing a similarity between image 310 and digital content items posted on the social networking system with large numbers of views, likes, shares, comments, or other reactions.

In some embodiments of the social networking system 106, a user of the computing device 300 inputs additional metadata associated with the digital content items. The social networking system 106 can use this metadata to rank digital content items or to calculate a predicted or actual user engagement score. For example, the user may input information associated with an image or video that identifies people or objects in an image or video, a location shown in an image or at which a video was taken, or topics with which the image or video is associated. The social networking system 106 may use the data input by the user to, for example, calculate an updated predicted user engagement score, update suggested rankings of digital content items, or update a suggested time period for the digital content items.

The computing device 300 of FIG. 3A contains input options that allow a user to supply some of the metadata described above. Specifically, the post management interface 304 includes the tagging option 314 and the location identifier option 316. A user of the computing device 300 may select the tagging option 314 to identify any person or object in an image displayed in the content display window 306. A user of the computing device 300 may also select the location identifier 316 to identify a place shown in the image or a location at which the image was captured.

As mentioned above, in some embodiments, the social networking system 106 calculates a predicted user engagement score for each timeframe within a time period. That time period may be selected by the user or, alternatively, suggested or automatically determined by the social networking system 106. For example, in FIG. 3A, the time period display 319 shows a time period automatically suggested by the social networking system 106.

In some embodiments, the social networking system 106 determines the suggested time period based on some or all of the factors that form the basis of the predicted user engagement score. For example, in some instances, the social networking system 106 suggests a time period by calculating predicted user engagement scores for various, randomized time periods within the next month (or year) by calculating the number of audience members predicted to be available to consume content and an amount of content predicted to be available for the audience members to consume and analyzing the contents of the digital content items to be posted by the user.

Returning to FIG. 3A, the post management interface 304 includes additional options that allow a user of the social networking system 106 to manage when the social networking system 106 will post digital content items, including the advanced time period option 320, the share now option 322, and the schedule share option 324. A user of the computing device 300 can select each of these options by using a touch gesture, a click, or other operation, for example. The advanced time period option 320 provides a user with further options to schedule posts and will be discussed further in connection with FIG. 3B.

The share now option 322 provides the user of the computing device 300 with the option to post digital content items now without scheduling a post in the future. In some embodiments, the post management interface 304 will display a confirmation notice (not shown) to ensure that by selecting the share now option 322, the user intends to post the digital content items now instead of according to a schedule in the future. Conversely, when the user of the computing device 300 selects the schedule share option 324, the post management interface 304 displays a scheduling options for the post of the selected digital content items within the selected time period. The scheduling options triggered by the schedule share option 324 will be discussed further below in connection with FIG. 3D.

Turning now to FIGS. 3B-3C, these figures illustrate some additional options for scheduling a post of digital content items. In some embodiments, the social networking system 106 provides a user with an option to select the number of digital content items to be posted through an account of the user within a time period or timeframe. For example, the social networking system 106 can provide the user with an option to select a specific number of digital content items, a minimum number of digital content items, or a maximum number of digital content items to post within a time period or timeframe.

As shown in FIG. 3A, for example, a user of the computing device 300 who selects the schedule share option 324 (without selecting the advanced time period option 320) may schedule a specific number of digital content items to post within a selected time period. As another example, a news organization may be the user of the computing device 300 to select a minimum of five news stories to post to its timeline on the social networking system within a time period of five hours. Alternatively, the news organization may select a minimum of three news stories to post to its timeline within timeframes repeating every three hours within a time period of three days.

FIG. 3B illustrates the computing device 300 with the post management interface 304 displaying additional options for scheduling the post of digital content items, including images 308, 310, and 312. The post management interface 304 in FIG. 3B displays several features and options that facilitate the scheduling of posts, including the content display window 306, a minimum post setting 330, a maximum post setting 332, a starting time period selector 334, an ending time period selector 336, an additional parameters option 338, and a set parameters option 340. A user of the computing device 300 may view the post management interface 304 depicted in FIG. 3B when, for example, the user selects the advanced time period option 320 shown in FIG. 3A.

As in FIG. 3A, the content display window 306 of FIG. 3B displays images 308, 310, and 312. The content display window 306 provides the user with the option to select specific images or other digital content items for which the user can add advanced scheduling options. A user may select an image or other digital content item, for example, by interacting with the content display window 306 with a touch gesture, a click, or other operation that selects the image or other digital content item. The user may view videos (not shown) or other additional digital content items by swiping left or right or by selecting the direction arrows 307a or 307b. As depicted in FIG. 3B, boxes 326 and 328 indicate that the user has selected images 308 and 310 for adding advanced scheduling options.

FIG. 3B further illustrates an embodiment with options to set a minimum or maximum number of digital content items to post during a time period. Specifically, a user may select the minimum post setting 330 or maximum post setting 332 to set a minimum or maximum number of digital content items to post within a time period. For example, a user of the computing device 300 may select specific digital content items, such as images 308 and 310, and the minimum post setting 330 to schedule a minimum post of images 308 and 310 during a time period. As explained below, a user can interact with the starting time period selector 334 and the ending time period selector 336 to select the start and the end of the time period for posting the digital content items.

Additionally, the user of the computing device 300 may select both specific digital content items as a minimum and specific digital content items as a maximum to post during a time period. For example, a user may select images 308 and 310 from the content display window 306 as well as the minimum post setting 330 to set up a minimum post of images 308 and 310 during a time period. After selecting the minimum post setting 330, the user may select images 308, 310, and 312 from the content display window 306 as well as the maximum post setting 332 to set up a maximum post of images 308, 310, and 312 during a time period.

In some embodiments, the text within the minimum post setting 330 and the text within the maximum post setting 332 changes (after the user has selected the minimum post setting 330 or maximum post setting 332) to display a number reflecting the minimum or maximum number of digital content items. Continuing the example from above, the text within the minimum post setting 330 would change from "MIN" to "MIN 2," after the user has selected the minimum post setting 330. Moreover, the text within the maximum post setting 332 would change from "MAX" to "MAX 3," after the user has selected the maximum post setting 332.

FIG. 3B also illustrates options displayed on the post management interface 304 for selecting a time period during which the social networking system 106 posts a minimum or maximum number of digital content items. The post management interface 304 of FIG. 3B displays the starting time period selector 334 and the ending time period selector 336. In some embodiments, the post management interface 304 of FIG. 3B displays as a default—within the starting time period selector 334 and the ending time period selector 336—starting and ending dates and times consistent with the time period selected by the user using the time period selector 318 of FIG. 3A or, alternatively, suggested or automatically determined by the social networking system 106. Continuing the example from FIG. 3A, in an embodiment displaying as a default the time period selected by the user using the time period selector 318, the starting date and time shown within the starting time period selector 334 would be "Jun. 1, 2106" at "12:00 AM," and the ending date and time shown within the ending time period selector 336 would be "Jun. 4, 2016" at "11:59 PM."

The user of the computing device 300, however, may adjust the date and time shown in the starting time period selector 334 and the date and time shown in the ending time period selector 336 to fine tune the start and end of the selected time period. In FIG. 3B, the user has adjusted the starting and ending dates and times to be "Jun. 3, 2016" at "10:00 AM" in the starting time period selector 334 and "Jun. 3, 2016" at 1:00 PM" in the ending time period selector 336. Accordingly, the starting time period selector 334 and ending time period selector 336 provide the user with an option to select a time period or portion thereof during which a minimum or maximum number of digital content items will post.

The post management interface 304 of FIG. 3B further provides an option to implement the scheduling parameters selected by the user. For example, when a user of the computing device 300 is satisfied with the options shown in the post management interface 304—including the content display window 306, the minimum post setting 330, the maximum post setting 332, the starting time period selector 334, and the ending time period selector 336—the user may select the set parameters option 340. By selecting the set parameters option 340, the user adds the selected options to the schedule for posting digital content items. In some embodiments, by selecting the set parameters option 340, the user adds the selected options from those depicted in FIG. 3B to those selected from the options depicted in FIG. 3A.

The post management interface 304 of FIG. 3B also provides an option to add more time periods for which the user may select additional scheduling options. For example, in some embodiments, when a user selects the additional parameters option 338, the post management interface 304 populates a refreshed set of options and features shown in FIG. 3B, including the content display window 306, the minimum post setting 330, the maximum post setting 332, the starting time period selector 334, the ending time period selector 336, and the set parameters option 340. In this embodiment, the refreshed post management interface 304 may display additional digital content items (that the user has not selected) to include with the additional scheduling options.

In some embodiments, when the user of the computing device 300 selects the additional parameters option 338, the refreshed post management interface 304 displays within the starting time period selector 334 and the ending time period selector 336 (as a default) starting and ending dates and times consistent with the initial time period selected by the user. As with the initial options displayed in the post management interface 304 of FIG. 3B, the user may adjust the dates and times within the starting time period selector 334 and the ending time period selector 336 within the refreshed post management interface 304.

Turning now to FIG. 3C, this figure displays the same features and options as those shown in FIG. 3B, except that the content display window 306 displays numbers representing different number totals of digital contents items, not specific digital content items. In the embodiment shown in FIG. 3C, the content display window 306 displays the numbers one through nine. By swiping left or right or, alternatively, selecting the direction arrow 307a or 307b, the user may view additional numbers (not shown), such as the numbers one through fifteen. In this embodiment, a user of the computing device 300 may select a number of digital content items for which to add scheduling options, rather than selecting specific images as shown in the content display window 306 of FIG. 3B.

In FIG. 3C, the minimum post setting 330 and maximum post setting 332 function similarly to the minimum post setting 330 and maximum post setting 332 illustrated in FIG. 3B. As shown in FIG. 3C, however, the user of the computing device 300 may select a number representing a total number of digital content items from the content display window 306 and the maximum post setting 332 to schedule a maximum number of digital content items to post during the selected time period.

Additionally, the user of the computing device 300 may select both a minimum and a maximum number of digital content items to post during a time period. For example, as indicated by FIG. 3B, a user may select both the number three from the content display window 306 and the minimum post setting 330 to set a minimum of three digital content items to post during a time period. After selecting the minimum post setting 330, the user may select both the number five from the content display window 306 and the maximum post setting 332 to set a maximum of five digital content items to post during the same time period.

In some embodiments, the text within the minimum post setting 330 and the text within the maximum post setting 332 changes (after the user has selected the minimum post setting 330 or maximum post setting 332) to display a number reflecting the minimum or maximum number of digital content items. Continuing the example from above, the text within the minimum post setting 330 would change from "MIN" to "MIN 3," after the user has selected the minimum post setting 330. The text within the maximum post setting 332 would change from "MAX" to "MAX 5," after the user has selected the maximum post setting 332.

In FIG. 3C, the additional parameters option 338 functions similarly to the additional parameters option 338 illustrated in FIG. 3B. For example, in some embodiments, when a user selects the additional parameters option 338, the post management interface 304 populates a refreshed set of options and features shown in FIG. 3C, including the content display window 306, the minimum post setting 330, the maximum post setting 332, the starting time period selector 334, the ending time period selector 336, and the set parameters option 340. In this embodiment, the refreshed post management interface 304 may display a new set of numbers as potential minimum and maximum post settings corresponding to the minimum post setting 330 and maximum post setting 332.

In some embodiments, when the user of the computing device 300 selects the additional parameters option 338, the refreshed post management interface 304 displays (as a default) the same number initially selected by the user in the content display window 306. Moreover, upon selecting the additional parameters option 338, the refreshed post management interface 304 displays (as a default) the dates and times within the starting time period selector 334 and the ending time period selector 336 consistent with the initial time period selected by the user using the time period selector 318 of FIG. 3A.

In yet another embodiment, when the user of the computing device 300 selects the additional parameters option 338, the refreshed post management interface 304 includes a mimic-and-repeat option (not shown) that, when selected by the user, automatically populates additional time periods of the same length as the initially selected time period (using the starting time period selector 334 and the ending time period selector 336) with the same minimum or maximum post settings initially selected by the user. In this embodiment, the mimic-and-repeat option allows the user to set consistent minimum or maximum numbers of digital content items to be posted during repeated time periods until the end of the larger, selected time period.

In addition to minimum and maximum post settings, the social networking system 106 provides additional scheduling options and restrictions for the digital content items to be posted. In some embodiments, the social networking system 106 provides a user of the social networking system with an option to select a minimum or maximum cost for the social networking system to post digital content items within a time period. For example, if the user wants to promote her posts by paying money, the social networking system 106 can provide, within the post management interface 304, a cost display window (not shown) that displays dollar amounts as possible minimum or maximum cost options when scheduling posts of multiple digital content items within a time period. A user of the computing device 300, for example, who selects $50 from the cost display window and the maximum post setting 332 would set up a maximum of $50 as a cost to post and promote the digital content items within the time period displayed by the starting time period selector 334 and the ending time period selector 336.

As mentioned above, in some embodiments, the social networking system 106 schedules a post of each of a plurality of digital content items during timeframes within a time period. In some embodiments, the social networking system 106 schedules a post for each of the plurality of digital content items during a timeframe from a set of timeframes with the highest predicted user engagement scores. As shown in FIG. 3D, the social networking system 106 has scheduled a post of images 308, 310, and 312 during different timeframes within the selected time period. The post management interface 304 displays five different thirty-minute timeframes, including timeframes 342, 344, 346, 348, and 350.

The post management interface 304 displays the five timeframes in descending order of predicted user engagement score, with the highest predicted user engagement score associated with timeframe 342 and the lowest predicted user engagement score associated with timeframe 350. The social networking system 106 has scheduled image 308 to post during timeframe 344 (Fri, June 3rd, 10:00-30 AM), image 310 to post during timeframe 342 (Fri, June 3rd, 12:00-30 PM), and image 3 to post during timeframe 348 (Sat, June 4th, 10:00-30 AM). Accordingly, the first ranked image, image 310, is scheduled to post during the timeframe with the highest predicted user engagement score of the five timeframes, timeframe 342; and the third ranked image, image 312, is scheduled to post during the timeframe with the second lowest predicted user engagement score of the five timeframes, timeframe 348. Although not shown in FIG. 3D, the social networking system 106 may also schedule the post of multiple digital content items during a single timeframe.

As also mentioned above, in some embodiments, the social networking system 106 schedules a post of multiple digital content items with a selected minimum or maximum number of digital content items to post within a timeframe or time period. In accordance with selected minimum or maximum parameters for digital content items, the post management interface 304 of FIG. 3D may display timeframes during which digital content items are scheduled in satisfaction of the minimum or maximum post settings. Alternatively, in some embodiments, when the user or the social networking system 106 has not selected any minimum or maximum post settings, the post management interface 304 of FIG. 3D may display timeframes during which digital content items are scheduled without any selected minimum or maximum parameters. In FIG. 3D, however, the post management interface 304 displays timeframes during which images 308, 310, and 312 are scheduled according to the settings selected in FIG. 3B. In other words, the post management interface 304 of FIG. 3D shows that the post management system 106 has scheduled a minimum post of images 308 and 310 during the time period (or time period portion) starting on Jun. 3, 2016 at 10:00 AM and ending on Jun. 3, 2016 at 1:00 PM.

In some of the embodiments discussed above, the social networking system 106 provides the user with an option to reschedule a post of a digital content item. For example, in FIG. 3D, a user of the computing device 300 may reschedule the post of images 308, 310, or 312 (individually) by selecting an image with a touch gesture and dragging and dropping the image into a different timeframe. As indicated by FIG. 3D, the user of the computing device 300 has selected image 312 from within timeframe 348 with a touch gesture and dragged-and-dropped image 312 into timeframe 346 to reschedule the post. By using this drag-and-drop gesture, the user has rescheduled image 312 to post during timeframe 346 (Fri, Jun 3rd, 10:00-30 PM).

Accordingly, if the user has some personal preferences (independent of predicted user engagement scores calculated by the social networking system 106) for when to post digital content, the user can modify and/or customize the schedule accordingly, while still working within the framework of the set of timeframes having the highest predicted user engagement.

Turning now to FIGS. 4A-4B, these figures and the following description provide additional detail concerning the social networking system 106 and its notification, rescheduling, and other functions for managing posts of multiple digital content items. As mentioned above, in some embodiments, the social networking system 106 provides a user with a notice that an actual user engagement score for a particular timeframe is less or more than the predicted user engagement score for the particular timeframe. Some embodiments of the disclosed invention provide the notice only when the actual user engagement score is below a threshold corresponding to the predicted user engagement score for a particular timeframe. Along with the notice, some embodiments of the social networking system 106 provide the user with an option to reschedule the post of one or more digital content items for a different timeframe.

The notice may take various formats. In some embodiments, the notice displays to the user the actual user engagement score and the predicted user engagement score for a particular timeframe. In other embodiments, the notice further displays a threshold as a numerical range above and/or below the predicted user engagement score for the particular timeframe. In yet other embodiments, the notice takes the form of text or a symbol that signals to the user that the actual user engagement score has not met (or has exceeded) expectations.

FIG. 4A illustrates one embodiment of a notification communicating to the user that the actual user engagement score has not met expectations, along with an option to reschedule the post of a digital content item. FIG. 4A depicts a computing device 400 having a display screen 402 showing a user interface 404 (e.g., a locked device user interface). The user interface 404 displays a notice 406 ("Actual user engagement score for image #3 did not meet expectations") and a rescheduling selector 408 ("Do you want to reschedule? Yes/No"). In some embodiments, the social networking system 106 provides a notice to the computing device 400 when, for example, the actual user engagement score for the timeframe during which an image is scheduled to post is less than a threshold corresponding to the predicted user engagement score for that timeframe.

Upon receipt of the notice 406, the user of the computing device 400 may select "yes" from within the rescheduling selector 408 using, for example, a touch gesture, to view rescheduling options provided by the user interface 404. If the user of the computing device 400 selects "no" from within the rescheduling selector 408, the user interface 404 removes the notice 406. Alternatively, the user may select the notice 406 to access additional details associated with the notice 406 and/or to open a corresponding social networking application on the computing device 400.

Turning now to FIG. 4B, this figure illustrates various timeframes as rescheduling options for the post of a digital content item. As mentioned above, certain embodiments of the social networking system 106 provide the user with an option to reschedule the post of a digital content item. In some embodiments, the social networking system 106 provides the user with a list or display of remaining timeframes with the highest predicted user engagement score within a time period. Alternatively, when the notice communicates to the user that the actual user engagement score for a particular time period exceeds a threshold corresponding to the predicted user engagement score, certain embodiments of the social networking system 106 provide the user with an option to reschedule a digital content item during the particular timeframe.

In some instances, rescheduling the digital content item involves replacing the scheduling of a lower ranked digital content item with the scheduling of a higher ranked digital content item. In other instances, rescheduling the digital content item involves rescheduling a digital content item to post during the same timeframe that another digital content item received from the user is scheduled to post.

FIG. 4B illustrates the user interface 404 displaying timeframes as options for rescheduling a digital content item. The user interface 404 displays the timeframe during which image 422 is currently scheduled to post, that is, timeframe 414. The user interface 404 further displays remaining timeframes 410, 412, 416, and 418 within a selected time period. In some embodiments, timeframes 410, 412, 414, 416, and 418 represent remaining timeframes with the highest predicted user engagement scores within the time period. In FIG. 4B, for example, the user interface 404 displays the timeframes 410, 412, 414, 416, and 418 in descending order of predicted user engagement score, with the highest predicted user engagement score (of the five timeframes) associated with timeframe 410 and the lowest predicted user engagement score (of the five timeframes) associated with timeframe 418. Alternatively, in some embodiments, the user interface 404 displays a predicted user engagement score corresponding to each of the timeframes 410, 412, 414, 416, and 418.

The user interface 404 of FIG. 4B further displays a suggested timeframe indicator 420 that communicates to the user of the computing device 400 a remaining timeframe suggested for rescheduling by the social networking system 106. In some embodiments, the social networking system 106 determines which of the remaining timeframes to suggest based on a predicted user engagement score for each of the remaining timeframes within the selected time period. In this embodiment, the social networking system 106 calculates a predicted user engagement score or an updated predicted user engagement score consistent with the description above.

In FIG. 4B, the suggested timeframe indicator 420 takes the form of a dotted line within the border of timeframe 410. But the suggested timeframe indicator 420 could take various other forms, including but not limited to a color different than the other timeframes, a clock icon within the timeframe suggested for rescheduling, or an arrow pointing to the suggested timeframe. A user of the computing device 400 who wishes to reschedule may select image 422 using, for example, a touch gesture and drag-and-drop image 422 into timeframe 410 or some other timeframe.

Figure 5:
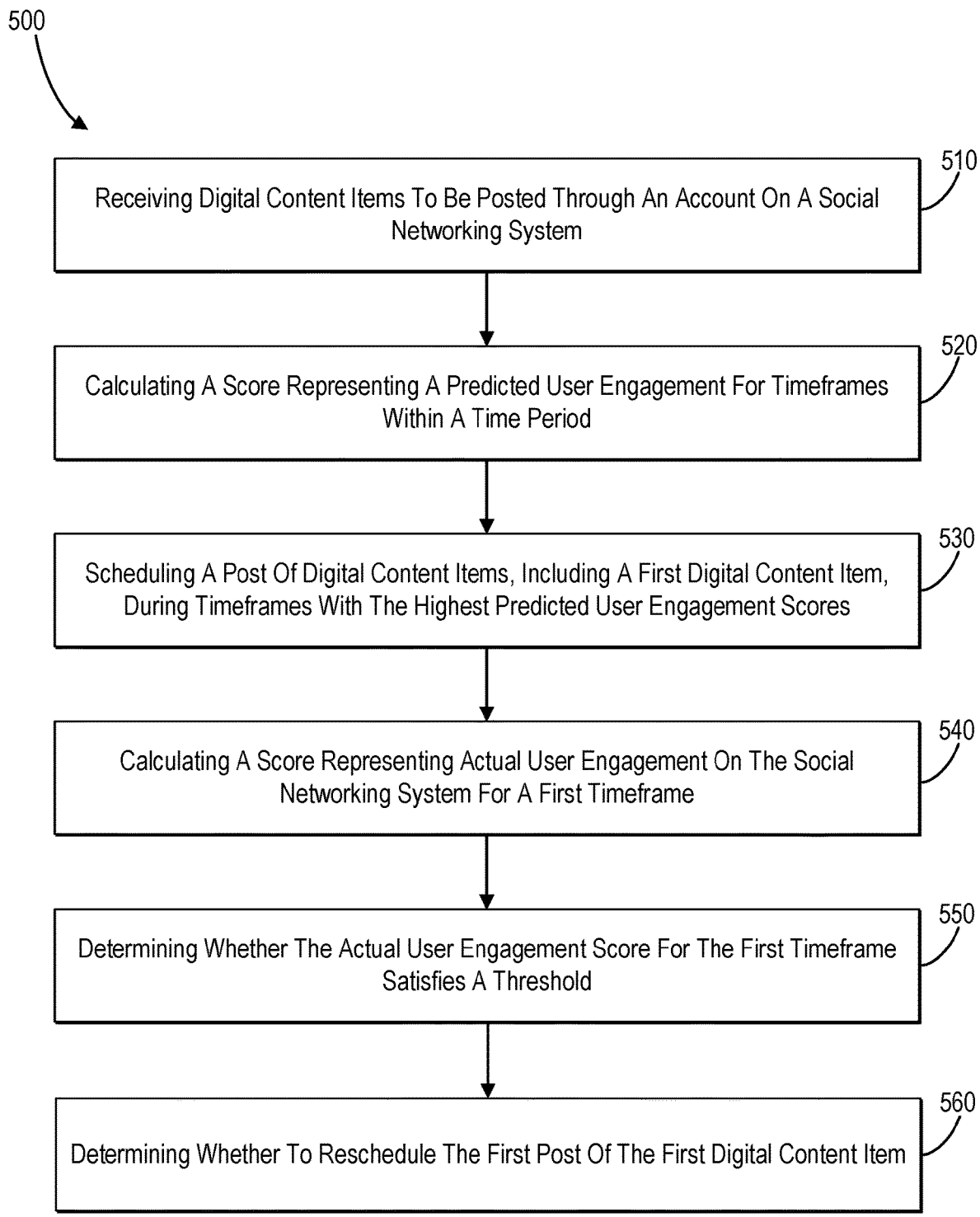
FIG. 5 illustrates a flowchart of a series of acts in a method of scheduling digital content items to optimize user engagement in accordance with one or more embodiments.

FIG. 5 illustrates a flowchart of a series of acts in a method 500 of scheduling a post of digital content items in accordance with one or more embodiments of the present invention. In one or more embodiments, the method 500 is performed in a digital medium environment that includes the social networking system 106. The social networking system 106 may provide a system that allows a user to schedule the post of multiple digital content items during timeframes with the highest predicted user engagement scores. The method 500 is intended to be illustrative of one or more methods in accordance with the present disclosure, and is not intended to limit potential embodiments. Alternative embodiments can include additional, fewer, or different steps than those articulated in FIG. 5.

As shown in FIG. 5, the method 500 includes an act 510 of receiving digital content items to be posted through an account on a social networking system. In particular, the act 510 can include receiving, from a user of a social networking system, a plurality of digital content items to be posted through an account of the user on the social networking system.

As illustrated in FIG. 5, the method 500 also includes an act 520 of calculating a score representing a predicted user engagement for timeframes within a time period. In particular, the act 520 can include calculating, by at least one processor, a score representing a predicted engagement by other users of the social networking system for each of a plurality of timeframes within a time period. For example, in one or more embodiments, calculating the predicted user engagement score includes predicting, by the at least one processor for each of the plurality of timeframes within a time period, a number of audience members predicted to be available to consume content based on a first time series and an amount of content predicted to be available for the audience to consume based on a second time series.

Furthermore, in one or more embodiments, calculating the predicted user engagement score includes predicting, by the at least one processor for each of the plurality of timeframes within a time period, a propensity of each member of an audience to consume content based on a third time series. As yet another example, in one or more embodiments, calculating the predicted user engagement score includes determining, by the at least one processor for each of the plurality of timeframes within a time period, a location and a time zone for members of an audience for each of the scheduled posts. Moreover, in one or more embodiments, calculating the predicted user engagement score includes calculating, for each of the plurality of timeframes within a time period, a predicted number of views, a predicted number of shares, a predicted number of comments, a predicted number of likes, or a predicted number of reactions of an audience. In particular, in one or more embodiments, the audience comprises key influencers.

As illustrated in FIG. 5, the method 500 also includes an act 530 of scheduling a post of digital content items, including a first digital content item, during timeframes with the highest predicted user engagement scores. In particular, the act 530 can include scheduling, by the at least one processor, a post of each of the plurality of digital content items during a set of timeframes of the plurality of timeframes with the highest predicted user engagement scores, wherein the scheduling comprises scheduling a first post of a first digital content item within a first timeframe of the set of timeframes. For example, in one or more embodiments, the scheduling includes scheduling, by the at least one processor, a second post of a second digital content item within a second timeframe of the set of timeframes.

As illustrated in FIG. 5, the method 500 also includes an act 540 of calculating a score representing actual user engagement on the social networking system for a first timeframe. In particular, the act 540 can include calculating, by the at least one processor, for the first timeframe, a score representing actual engagement by the other users of the social networking system for the first timeframe. For example, in one or more embodiments, calculating the actual user engagement score for the first timeframe includes calculating, by the at least one processor for the first timeframe, a number of audience members available to consume content and an amount of content available for the audience members to consume. Moreover, in one or more embodiments, calculating the amount of content available for the audience members to consume includes calculating, by the at least one processor for the first timeframe, an amount of content produced by at least one of the other users of the social networking system and available for consumption by audience members.

As illustrated in FIG. 5, the method 500 also includes an act 550 of determining whether the actual user engagement score for the first timeframe satisfies a threshold. In particular, the act 550 can include determining, by the at least one processor, whether the actual user engagement score for the first timeframe satisfies a threshold corresponding to a predicted user engagement score for the first timeframe. For example, in one or more embodiments, determining whether the actual user engagement score for the first timeframe satisfies a threshold includes determining, by the at least one processor, that the actual user engagement score for the first timeframe is less than the threshold corresponding to the predicted user engagement score for the first timeframe.

Furthermore, in one or more embodiments, determining whether the actual user engagement score for the first timeframe satisfies a threshold includes determining, by the at least one processor, that the actual user engagement score for the first timeframe is more than the threshold corresponding to the predicted user engagement score for the first timeframe. Moreover, in one or more embodiments, determining whether the actual user engagement score for the first timeframe satisfies a threshold includes determining, by the at least one processor, that the actual user engagement score for the first timeframe exceeds the highest predicted user engagement score for the set of timeframes of the plurality of timeframes with the highest predicted user engagement scores.

As illustrated in FIG. 5, the method 500 also includes an act 560 of determining whether to reschedule the first post of the first digital content item. In particular, the act 560 can include in response to determining whether the actual user engagement score for the first timeframe satisfies the threshold corresponding to the predicted user engagement score for the first timeframe, determining whether to reschedule the first post of the first digital content item. For example, in one or more embodiments, determining whether to reschedule the post of the first digital content item includes comparing, by the at least one processor, an expected loss of user engagement for the first digital content item, if posted during the first timeframe, with an expected gain of user engagement for the first digital content item, if posted during a later timeframe of the set of timeframes.

In one or more embodiments, the method 500 also includes, in response to determining that the actual user engagement score for the first timeframe satisfies the threshold corresponding to the predicted user engagement score for the first timeframe, post, by the at least one processor, the first digital content item during the first timeframe.

Similarly, in one or more embodiments, the method 500 also includes determining, by the at least one processor, that the actual user engagement score for the first timeframe exceeds the highest predicted user engagement score for the set of timeframes of the plurality of timeframes with the highest predicted user engagement scores; and based on the determination that the actual user engagement score for the first timeframe exceeds the highest predicted user engagement score for the set of timeframes, providing, by the at least one processor, an option to the user to reschedule a post of a second digital content item during the first timeframe.

Conversely, in one or more embodiments, the method 500 also includes determining, by the at least one processor, that the actual user engagement score for the first timeframe is less than the threshold corresponding to the predicted user engagement score for the first timeframe; and rescheduling, by the at least one processor, the first post of the first digital content item for a later timeframe of the set of timeframes of the plurality of timeframes with the highest predicted user engagement scores.

Additionally, in one or more embodiments, the method 500 also includes calculating, by the at least one processor during the time period, an updated predicted user engagement score for one or more remaining timeframes of the plurality of timeframes. In particular, in one or more embodiments, the method 500 further includes based on the updated predicted user engagement scores, rescheduling, by the at least one processor, a post of at least one of the plurality of digital content items.

Furthermore, in one or more embodiments, the method 500 also includes receiving, by the at least one processor, a selection of the time period by the user and a selection of a number of digital content items from the plurality of digital content items to be posted through the account of the user within the time period. In particular, in one or more embodiments, the number of digital content items includes a minimum or maximum number of digital content items from the plurality of digital content items to be posted through the account of the user within the time period.

Additionally, in one or more embodiments, the method 500 also includes scheduling, by the at least one processor, a second post of a second digital content item within a second timeframe of the set of timeframes; calculating, by the at least one processor, for the second timeframe, a score representing actual engagement by the other users of the social networking system for the second timeframe; determining, by the at least one processor, that the actual user engagement score for the second timeframe is less than a threshold corresponding to a predicted user engagement score for the second timeframe; and in response to determining that the actual user engagement score for the second timeframe is less than the threshold corresponding to the predicted user engagement score for the second timeframe, providing an option to the user to reschedule the second post of the second digital content item.

Moreover, in one or more embodiments, the method 500 also includes providing, by the at least one processor, a notification to the user that the actual user engagement score for the second timeframe is less than expected; and providing, by the at least one processor, the option to the user to reschedule the second post in response to one or more interactions with the notification.

Finally, in one or more embodiments, the method 500 also includes based on the calculation of the actual user engagement score on the social networking system for the first timeframe, calculating, by the at least one processor during the time period, an updated predicted user engagement score for one or more remaining timeframes of the plurality of timeframes.

Figure 6:
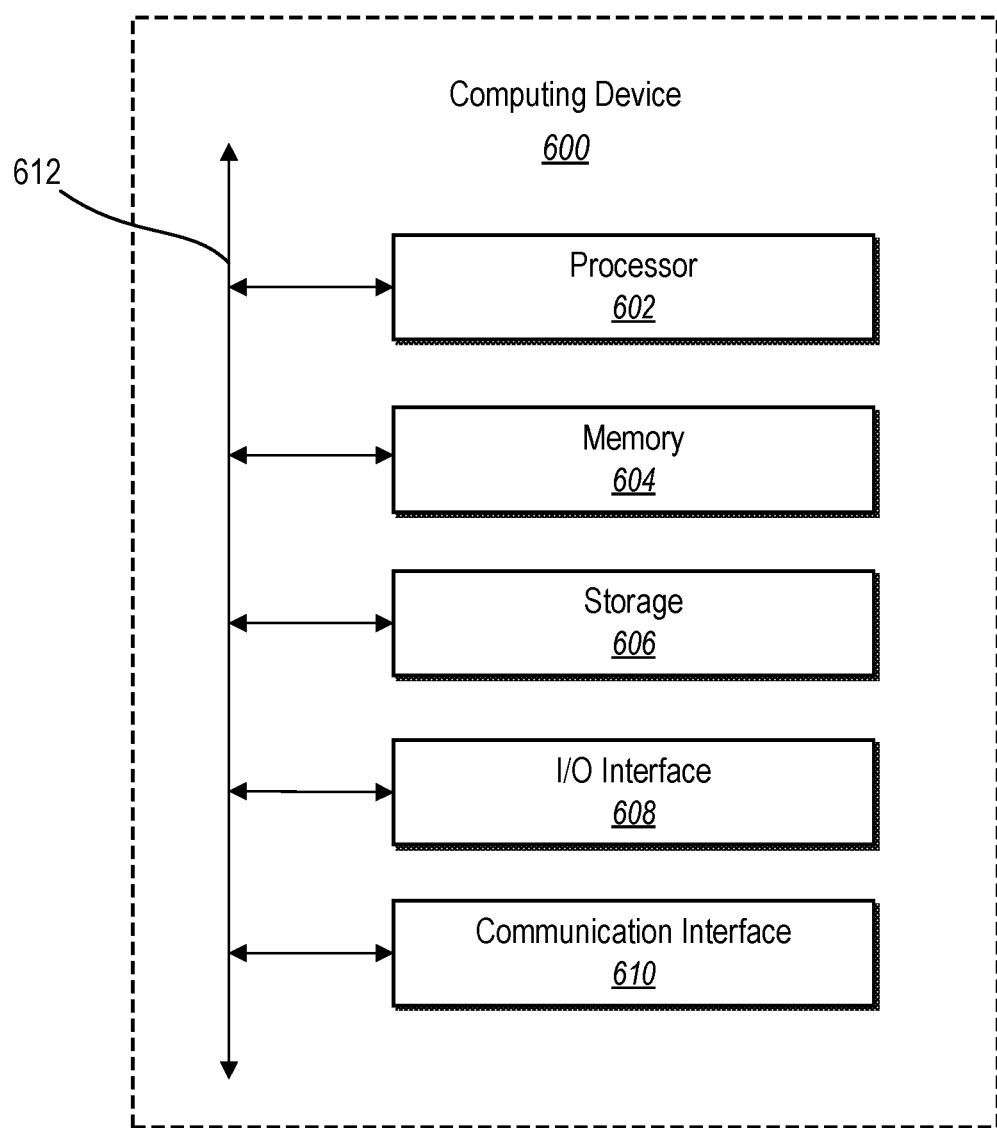
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the social networking system 106. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 806.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touchscreen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC)

bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 7:
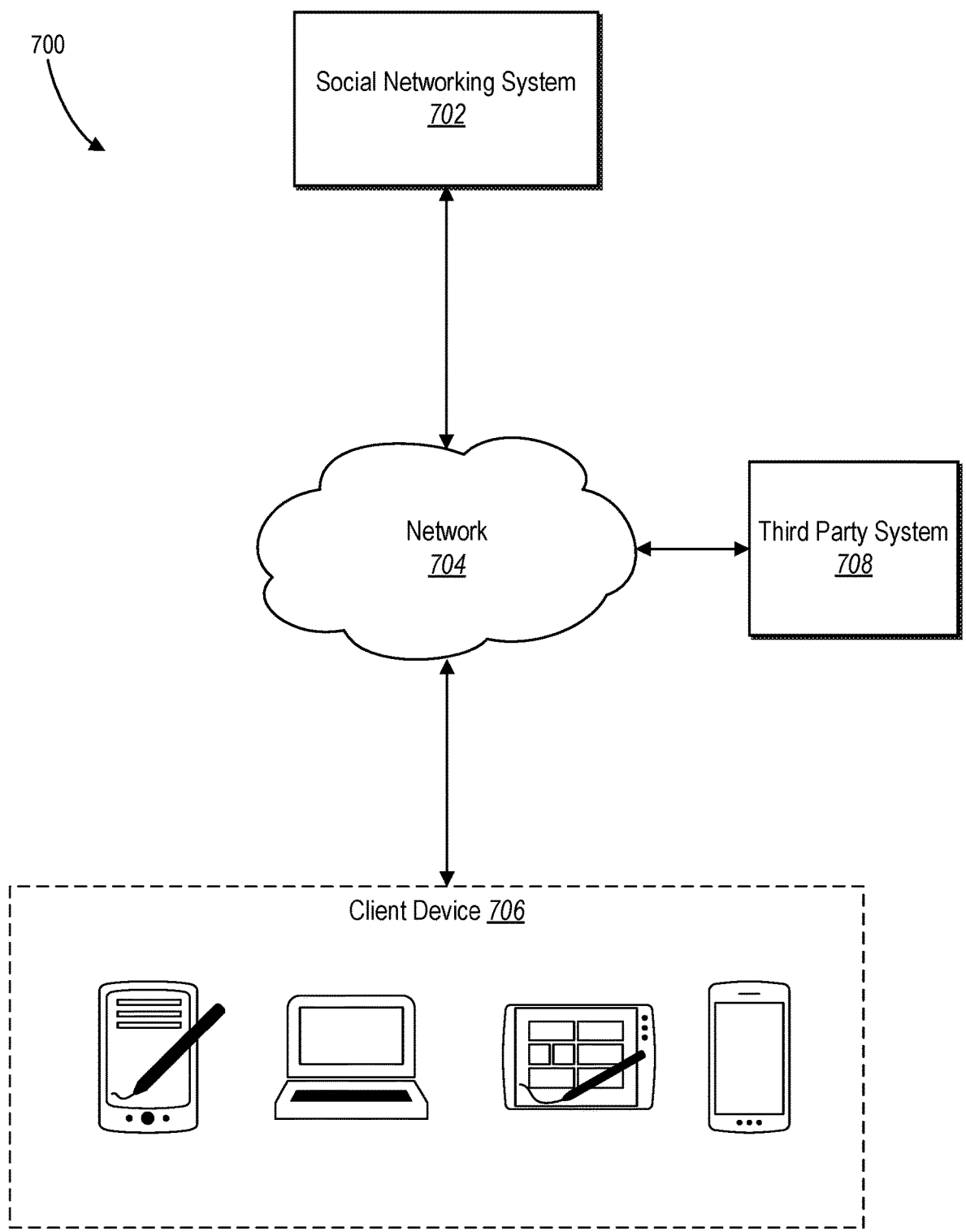
FIG. 7 illustrates a network environment of a social networking system according to one or more embodiments.

FIG. 7 illustrates an example network environment 700 of a social-networking system. Network environment 700 includes a client device 706, a social-networking system 702, and a third-party system 708 connected to each other by a network 704. Although FIG. 7 illustrates a particular arrangement of client device 706, social-networking system 702, third-party system 708, and network 704, this disclosure contemplates any suitable arrangement of client device 706, social-networking system 702, third-party system 708, and network 704. As an example and not by way of limitation, two or more of client device 706, social-networking system 702, and third-party system 708 may be connected to each other directly, bypassing network 704. As another example, two or more of client device 706, social-networking system 702, and third-party system 708 may be physically or logically co-located with each other in whole or in part. Moreover, although FIG. 7 illustrates a particular number of client devices 706, social-networking systems 702, third-party systems 708, and networks 704, this disclosure contemplates any suitable number of client devices 706, social-networking systems 702, third-party systems 708, and networks 704. As an example and not by way of limitation, network environment 700 may include multiple client device 706, social-networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client device 706, social-networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include any of the computing devices discussed above in relation to FIG. 6. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client device 706 one or more Hyper Text Markup Language (HTML) files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 702 may be a network-addressable computing system that can host an online social network. Social-networking system 702 may generate, store, receive, and send social-networking data, such as, for example, user-profile data, concept-profile data, social-graph information, or other suitable data related to the online social network. Social-networking system 702 may be accessed by the other components of network environment 700 either directly or via network 704. In particular embodiments, social-networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, a social-networking system 702, or a third-party system 708 to manage, retrieve, modify, add, or delete, the information stored in data store.

In particular embodiments, social-networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 702 may provide users of the online social network the ability to communicate and interact with other users. In particular embodiments, users may join the online social network via social-networking system 702 and then add connections (e.g., relationships) to a number of other users of social-networking system 702 whom they want to be connected to. Herein, the term "friend" may refer to any other user of social-networking system 702 with whom a user has formed a connection, association, or relationship via social-networking system 702.

In particular embodiments, social-networking system 702 may provide users with the ability to take actions on various types of items or objects, supported by social-networking system 702. As an example and not by way of limitation, the items and objects may include groups or social networks to which users of social-networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 702 or by an external system of third-party system 708, which is separate from social-networking system 702 and coupled to social-networking system 702 via a network 704.

In particular embodiments, social-networking system 702 may be capable of linking a variety of entities. As an example and not by way of limitation, social-networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social-networking system 702. In particular embodiments, however, social-networking system 702 and third-party systems 708 may operate in conjunction with each other to provide social-networking services to users of social-networking system 702 or third-party systems 708. In this sense, social-networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client device 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 702 also includes user-generated content objects, which may enhance a user's interactions with social-networking system 702. User-generated content may include anything a user can add, upload, send, or "post" to social-networking system 702. As an example and not by way of limitation, a user communicates posts to social-networking system 702 from a client device 706. Posts may include data such as status updates or other textual data, location information, photos, videos, links, music or other similar data or media. Content may also be added to social-networking system 702 by a third-party through a "communication channel," such as a newsfeed or stream.

In particular embodiments, social-networking system 702 may include a variety of servers, sub-systems, programs, modules, logs, and data stores. In particular embodiments, social-networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 702 may also include suitable components such as network interfaces, security mechanisms, load balancers, failover servers, management-and-network-operations consoles, other suitable components, or any suitable combination thereof. In particular embodiments, social-networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 702 to one or more client devices 706 or one or more third-party system 708 via network 704. The web server may include a mail server or other messaging functionality for receiving and routing messages between social-networking system 702 and one or more client devices 706. An API-request server may allow a third-party system 708 to access information from social-networking system 702 by calling one or more APIs. An action logger may be used to receive communications from a web server about a user's actions on or off social-networking system 702. In conjunction with the action log, a third-party-content-object log may be maintained of user exposures to third-party-content objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of social-networking system 702. A privacy setting of a user determines how particular information associated with a user can be shared. The authorization server may allow users to opt in to or opt out of having their actions logged by social-networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client devices 706 associated with users. Advertisement-pricing modules may combine social information, the current time, location information, or other suitable information to provide relevant advertisements, in the form of notifications, to a user.

Figure 8:
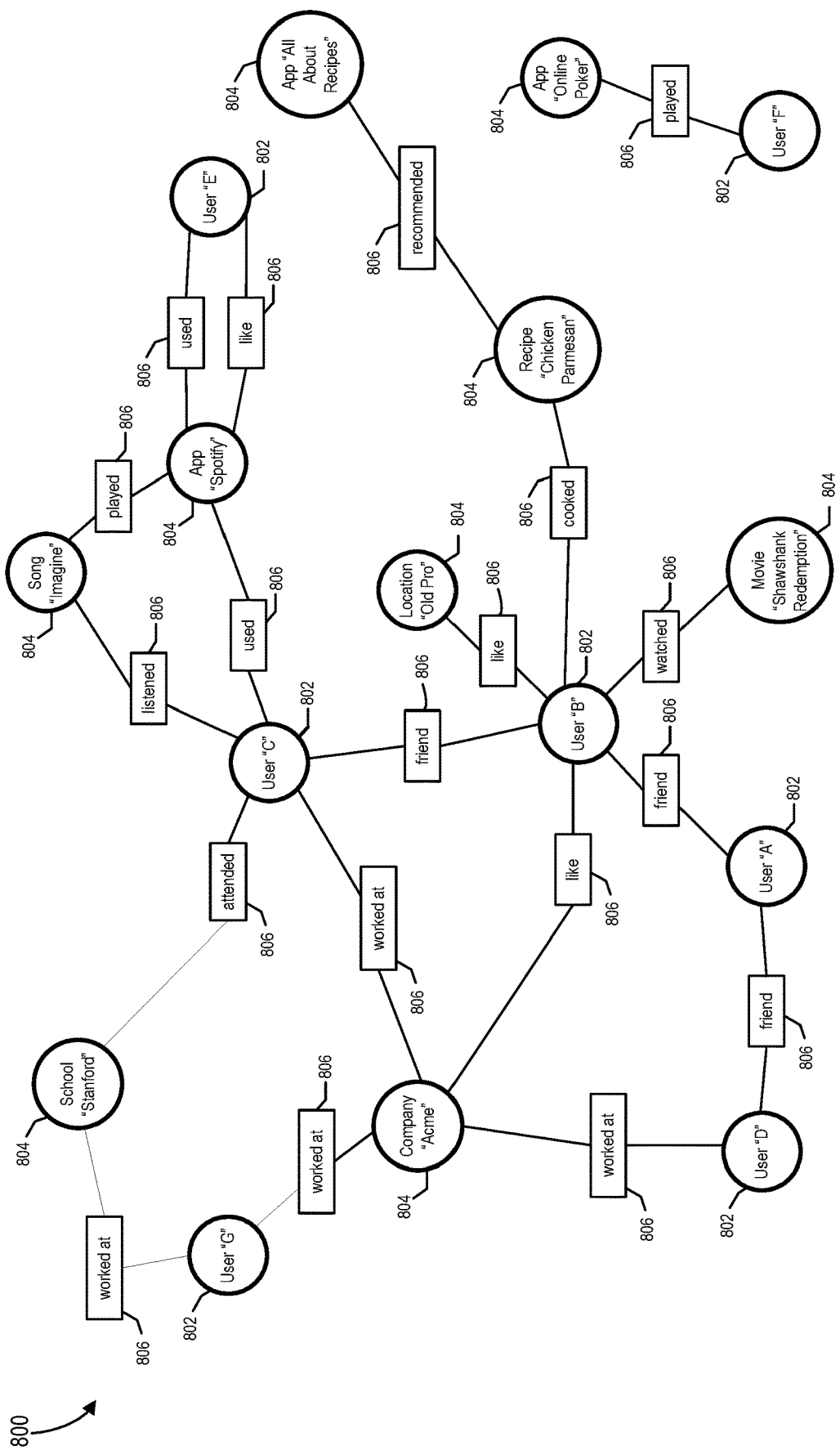
FIG. 8 illustrates an example social graph for a social networking system in accordance with one or more embodiments.

FIG. 8 illustrates example social graph 800. In particular embodiments, social-networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 702, client device 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social-networking system 702. As an example and not by way of limitation, a user may be an individual (human user), an entity (e.g., an enterprise, business, or third-party application), or a group (e.g., of individuals or entities) that interacts or communicates with or over social-networking system 702. In particular embodiments, when a user registers for an account with social-networking system 702, social-networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 702. In particular embodiments, a user node 802 may be associated with information provided by a user or information gathered by various systems, including social-networking system 702. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 702 or a third-party website associated with a web-application server); an entity (such as, for example, a person, business, group, sports team, or celebrity); a resource (such as, for example, an audio file, video file, digital photo, text file, structured document, or application) which may be located within social-networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social-networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 702. Profile pages may also be hosted on third-party websites associated with a third-party server 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 706 to send to social-networking system 702 a message indicating the user's action. In response to the message, social-networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 702 may send a "friend request" to the second user. If the second user confirms the "friend request," social-networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 702 may create an edge 806 between a user node 802 and a concept node 804 in social graph 800. As an example and not by way of limitation, a user viewing a concept-profile page (such as, for example, by using a web browser or a special-purpose application hosted by the user's client device 706) may indicate that he or she likes the concept represented by the concept node 804 by clicking or selecting a "Like" icon, which may cause the user's client device 706 to send to social-networking system 702 a message indicating the user's liking of the concept associated with the concept-profile page. In response to the message, social-networking system 702 may create an edge 806 between user node 802 associated with the user and concept node 804, as illustrated by "like" edge 806 between the user and concept node 804. In particular embodiments, social-networking system 702 may store an edge 806 in one or more data stores. In particular embodiments, an edge 806 may be automatically formed by social-networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 702) or RSVP (e.g., through social-networking system 702) to an event associated with the advertisement. In addition or as an alternative, an advertisement may include social-networking-system context directed to the user. As an example and not by way of limitation, an advertisement may display information about a friend of the user within social-networking system 702 who has taken an action associated with the subject matter of the advertisement.

In particular embodiments, social-networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 702 may calculate a coefficient based on a user's actions. Social-networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social-networking system 702 may analyze a user's actions to determine whether one or more of the actions indicate an affinity for subject matter, content, other users, and so forth. As an example and not by way of limitation, if a user may make frequently posts content related to "coffee" or variants thereof, social-networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 702 may calculate a coefficient based on the type of relationship between particular objects. Referencing the social graph 800, social-networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 702 may determine that the user has a higher coefficient with respect to the first photo than the second photo because having a tagged-in-type relationship with content may be assigned a higher weight and/or rating than having a like-type relationship with content. In particular embodiments, social-networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 706 of the user). A first user may be more interested in other users or concepts that are closer to the first user. As an example and not by way of limitation, if a user is one mile from an airport and two miles from a gas station, social-networking system 702 may determine that the user has a higher coefficient for the airport than the gas station based on the proximity of the airport to the user.

In particular embodiments, social-networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 702 may provide information that is relevant to user's interests and current circumstances, increasing the likelihood that they will find such information of interest. In particular embodiments, social-networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social-networking system 702 may calculate the coefficient (or access the coefficient information if it has previously been calculated and stored). In particular embodiments, social-networking system 702 may measure an affinity with respect to a particular process. Different processes (both internal and external to the online social network) may request a coefficient for a particular object or set of objects. Social-networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social-networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 702 may send a request to the data store for the object. The request may identify the user associated with the request and may only be sent to the user (or a client device 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
receiving, from a client device, a plurality of digital content items to be posted through an account of a user on a social networking system;
calculating, by at least one processor, a predicted engagement score representing a predicted engagement by other users of the social networking system for each of a plurality of timeframes within a time period;
providing, for display within a first graphical user interface of the client device, a share option and a set of suggested timeframes for a plurality of posts of the plurality of digital content items, wherein the set of suggested timeframes correspond to a set of highest predicted user engagement scores and the set of suggested timeframes comprise a first suggested timeframe for a first post of a first digital content item;
based on receiving an indication of a user selection of the share option from the client device, scheduling the plurality of posts of the plurality of digital content items during the set of suggested timeframes;
determining, by the at least one processor, an actual user engagement score representing actual engagement by one or more users of the social networking system for the first suggested timeframe does not satisfy a threshold corresponding to a predicted user engagement score for the first suggested timeframe; and
in response to determining the actual user engagement score for the first suggested timeframe does not satisfy the threshold corresponding to the predicted user engagement score for the first suggested timeframe, providing, for display within a second graphical user interface of the client device, a rescheduling option to reschedule the first post of the first digital content item.

2. The method of claim 1, further comprising:
receiving, from the client device, an indication of a user selection of the rescheduling option to reschedule the first post of the first digital content item; and based on the user selection of the rescheduling option, providing, for display on the client device, an additional set of suggested timeframes and selectable options to reschedule the first post of the first digital content item during the additional set of suggested timeframes.

3. The method of claim 2, further comprising:
receiving, from the client device, an indication of a user selection of a selectable option to reschedule the first post of the first digital content item during a later suggested timeframe from among the additional set of suggested timeframes; and
based on the user selection of the selectable option to reschedule the first post of the first digital content item during the later suggested timeframe, rescheduling, by the at least one processor, the first post of the first digital content item for the later suggested timeframe.

4. The method of claim 1, further comprising:
calculating, by the at least one processor during the time period, an updated predicted user engagement score for one or more remaining timeframes of the plurality of timeframes.

5. The method of claim 4, further comprising:
based on the updated predicted user engagement scores for one or more remaining timeframes of the plurality of timeframes, providing, for display on the client device, an additional rescheduling option to reschedule a post of at least one of the plurality of digital content items.

6. The method of claim 1, further comprising:
receiving, by the at least one processor, a selection of the time period by the user and a selection of a number of digital content items from the plurality of digital content items to be posted through the account of the user within the time period.

7. The method of claim 6, wherein the number of digital content items comprises a minimum or maximum number of digital content items from the plurality of digital content items to be posted through the account of the user within the time period.

8. The method of claim 1, wherein the scheduling of the plurality of posts of the plurality of digital content items further comprises scheduling, by the at least one processor, a second post of a second digital content item within a second suggested timeframe of the set of suggested timeframes, the method further comprising:
calculating, by the at least one processor, for the second suggested timeframe, a second actual engagement score representing actual engagement by the one or more users of the social networking system for the second suggested timeframe;
determining, by the at least one processor, that the second actual user engagement score for the second suggested timeframe satisfies a threshold corresponding to a predicted user engagement score for the second suggested timeframe; and
based on determining that the actual user engagement score for the second suggested timeframe satisfies the threshold corresponding to the predicted user engagement score for the second suggested timeframe, posting the second post of the second digital content item during the second suggested timeframe.

9. The method of claim 1, further comprising
providing, for display within the second graphical user interface of the client device, a notification to the user that the actual user engagement score for the first suggested timeframe is less than expected.

10. A system comprising:
at least one processor; and
at least one non-transitory computer readable storage medium storing instructions that, when executed by the at least one processor, cause the system to:
receive, from a client device, a plurality of digital content items to be posted through an account of a user on a social networking system;
calculate a predicted engagement score representing a predicted engagement by other users of the social networking system for each of a plurality of timeframes within a time period;
provide, for display within a first graphical user interface of the client device, a share option and a set of suggested timeframes for a plurality of posts of the plurality of digital content items, wherein the set of suggested timeframes correspond to a set of highest predicted user engagement scores and the set of suggested timeframes comprises a first suggested timeframe for a first post of a first digital content item;
based on receiving an indication of a user selection of the share option from the client device, schedule the plurality of posts of the plurality of digital content items during the set of suggested timeframes;
determine an actual user engagement score representing actual engagement by one or more users of the social networking system for the first suggested timeframe does not satisfy a threshold corresponding to a predicted user engagement for the first suggested timeframe; and
in response to determining the actual user engagement for the first suggested timeframe does not satisfy the threshold corresponding to a predicted user engagement score for the first suggested timeframe, providing, for display within a second graphical user interface of the client device, a rescheduling option to reschedule the first post of the first digital content item.

11. The system of claim 10, further comprising instructions that, when executed by the at least one processor, cause the system to:
receive, from the client device, an indication of a user selection of the rescheduling option to reschedule the first post of the first digital content item; and
based on the user selection of the rescheduling option, provide, for display on the client device, an additional set of suggested timeframes and selectable options to reschedule the first post of the first digital content item during the additional set of suggested timeframes.

12. The system of claim 11, further comprising instructions that, when executed by the at least one processor, cause the system to:
receive, from the client device, an indication of a user selection of a selectable option to reschedule the first post of the first digital content item during a later suggested timeframe from among the additional set of suggested timeframes; and
based on the user selection of the selectable option to reschedule the first post of the first digital content item during the later suggested timeframe, reschedule the first post of the first digital content item for the later suggested timeframe.

13. The system of claim 10, further comprising instructions that, when executed by the at least one processor, cause the system to determine the actual user engagement score for the first suggested timeframe in part by calculating, for the first suggested timeframe, a number of audience members available to consume content and an amount of content available for the audience members to consume.

14. The system of claim 13, further comprising instructions that, when executed by the at least one processor, cause the system to calculate the amount of content available for the audience members to consume by calculating, for the first suggested timeframe, an amount of content produced by at least one of the other users of the social networking system and available for consumption by the audience members.

15. A non-transitory computer readable medium storing instructions thereon that, when executed by at least one processor, cause a computer system to:
receive, from a client device, a plurality of digital content items to be posted through an account of a user on a social networking system;
calculate a predicted engagement score representing a predicted engagement by other users of the social networking system for each of a plurality of timeframes within a time period;
provide, for display within a first graphical user interface of the client device, a share option and a set of suggested timeframes for a plurality of posts of the plurality of digital content items, wherein the set of suggested timeframes correspond to a set of highest predicted user engagement scores and the set of suggested timeframes comprises a first suggested timeframe for a first post of a first digital content item;
based on receiving an indication of a user selection of the share option from the client device, schedule the plurality of posts of the plurality of digital content items during the set of suggested timeframes;
determine an actual user engagement score representing actual engagement by one or more users of the social networking system for the first suggested timeframe does not satisfy a threshold corresponding to a predicted user engagement for the first suggested timeframe; and
in response to determining the actual user engagement for the first suggested timeframe does not satisfy the threshold corresponding to a predicted user engagement score for the first suggested timeframe, providing, for display within a second graphical user interface of the client device, a rescheduling option to reschedule the first post of the first digital content item.

16. The non-transitory computer readable medium of claim 15, further comprising instructions that, when executed by the at least on processor, cause the computer system to calculate the predicted user engagement score for each of the plurality of timeframes in part by predicting, for each of the plurality of timeframes within the time period, a number of audience members predicted to be available to consume content based on a first time series and an amount of content predicted to be available for the audience to consume based on a second time series.

17. The non-transitory computer readable medium of claim 15, further comprising instructions that, when executed by the at least on processor, cause the computer system to calculate the predicted user engagement score for each of the plurality of timeframes in part by predicting, for each of the plurality of timeframes within the time period, a propensity of each member of an audience to consume content based on a third time series.

18. The non-transitory computer readable medium of claim 15, further comprising instructions that, when executed by the at least on processor, cause the computer system to calculate the predicted user engagement score for each of the plurality of timeframes in part by determining, for each of the plurality of timeframes within the time period, a location and a time zone for members of an audience for each of the scheduled plurality of posts.

19. The non-transitory computer readable medium of claim 15, further comprising instructions that, when executed by the at least on processor, cause the computer system to calculate the predicted user engagement score for each of the plurality of timeframes in part by calculating, for each of the plurality of timeframes within the time period, a predicted number of views, a predicted number of shares, a predicted number of comments, a predicted number of likes, or a predicted number of reactions of an audience.

20. The non-transitory computer readable medium of claim 15, further comprising instructions that, when executed by the at least one processor, cause the computer system to:
- based on the calculation of the actual user engagement score on the social networking system for the first suggested timeframe, calculate, during the time period, an updated predicted user engagement score for one or more remaining timeframes of the plurality of timeframes.

\* \* \* \* \*